US012633233B2

(12) United States Patent
Warschawski

(10) Patent No.: US 12,633,233 B2
(45) Date of Patent: May 19, 2026

(54) SIGNAGE SYSTEM FOR SPORTS NETTING

(71) Applicant: AVIV, LLC, Baltimore, MD (US)

(72) Inventor: David Warschawski, Baltimore, MD (US)

( * ) Notice: Subject to any disclaimer, the term of this patent is extended or adjusted under 35 U.S.C. 154(b) by 41 days.

(21) Appl. No.: 18/360,126

(22) Filed: Jul. 27, 2023

(65) Prior Publication Data

US 2024/0046823 A1 Feb. 8, 2024

Related U.S. Application Data

(60) Provisional application No. 63/394,739, filed on Aug. 3, 2022.

(51) Int. Cl.
*G09F 7/18* (2006.01)

(52) U.S. Cl.
CPC ........ *G09F 7/18* (2013.01); *G09F 2007/1839* (2013.01)

(58) Field of Classification Search
CPC .... G09F 7/18; G09F 2007/1839; G09F 23/00; G09F 23/0066; E04H 17/06
See application file for complete search history.

(56) References Cited

U.S. PATENT DOCUMENTS 2,902,786 A * 9/1959 Schneider ................ G09F 7/08 40/658
3,774,884 A * 11/1973 Singer ..................... E04H 17/06 256/34
4,505,061 A * 3/1985 Neuburger ............. H02B 15/04 40/605
4,964,618 A * 10/1990 Kennedy ............. E04H 17/1413 256/65.09
5,390,462 A * 2/1995 Kreiter ................ E04F 21/0069 52/506.01
5,441,239 A * 8/1995 Watson ................... E04H 17/06 40/622
5,444,929 A * 8/1995 Joseloff ..................... G09F 1/10 40/657
5,725,201 A * 3/1998 Parth ......................... E04C 2/20 256/73
5,865,427 A * 2/1999 Cowan .................. E01F 13/028 256/12.5
8,322,667 B2 * 12/2012 Zannoni ................ E04H 17/066 248/311.2
8,464,487 B2 * 6/2013 Kenda ................. E04F 13/0812 52/506.08
10,290,238 B1 * 5/2019 Mitchell ................. F16B 9/054
(Continued)

FOREIGN PATENT DOCUMENTS

AU 2003100411 A4 * 7/2003 ............ E01F 13/022
GB 2468154 A * 9/2010 ........... A63B 63/004

*Primary Examiner* — Cassandra Davis
(74) *Attorney, Agent, or Firm* — MEDLER FERRO WOODHOUSE & MILLS PLLC

(57) ABSTRACT

A signage system for a sports net where the sports net including a plurality of cords. The signage system including a front surface configured for a display of indicia including at least one of text and graphics, a rear surface and a plurality of fasteners coupled to the rear surface, each of the plurality of fasteners including a channel configured to receive a cord included in the plurality of cords. The plurality of fasteners are positioned at locations of the rear surface to secure to a plurality of different cords included in the plurality of cords.

14 Claims, 20 Drawing Sheets

(56) References Cited

U.S. PATENT DOCUMENTS

| | | | | |
|---|---|---|---|---|
| 2002/0116846 | A1* | 8/2002 | Wu | G09F 7/00<br>40/320 |
| 2006/0086878 | A1* | 4/2006 | Cormier | G09F 7/18<br>248/314 |
| 2022/0296976 | A1* | 9/2022 | Goodman | D02G 3/449 |
| 2022/0339511 | A1* | 10/2022 | Goodman | A63B 47/04 |

* cited by examiner

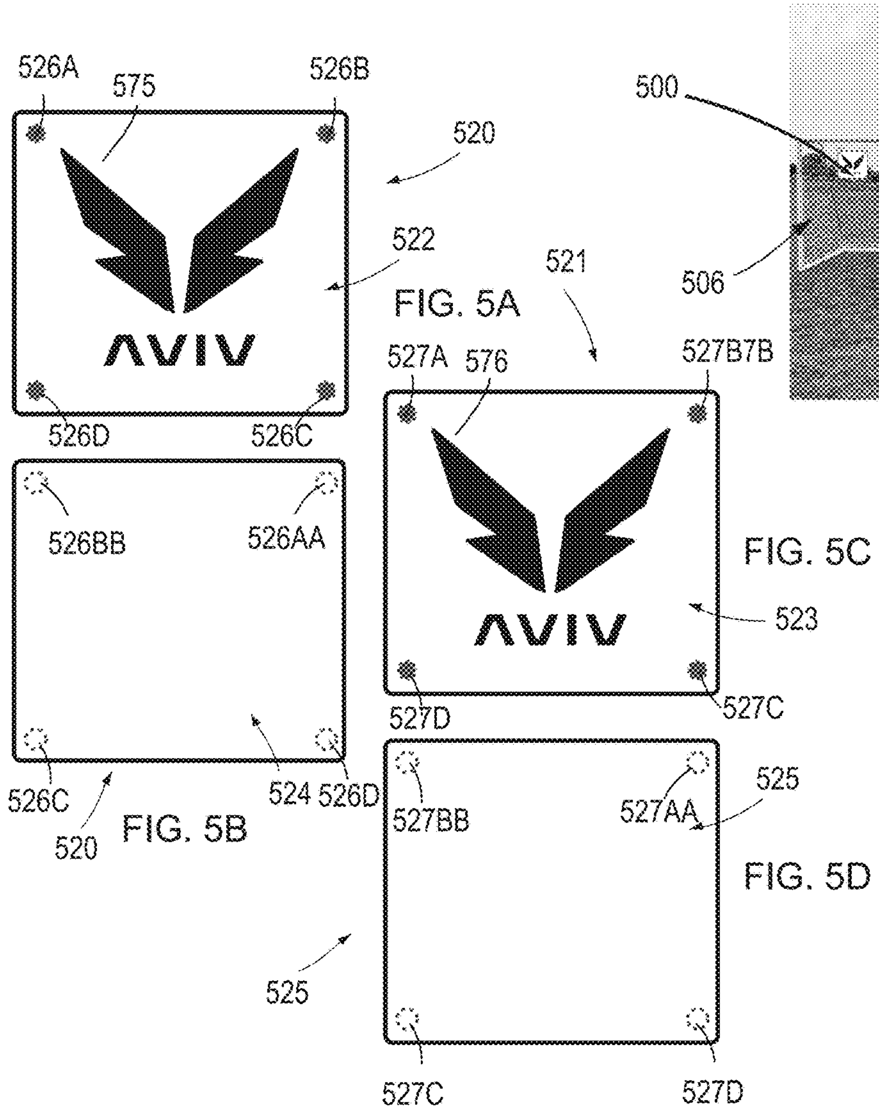
FIG. 5A
FIG. 5B
FIG. 5C
FIG. 5D
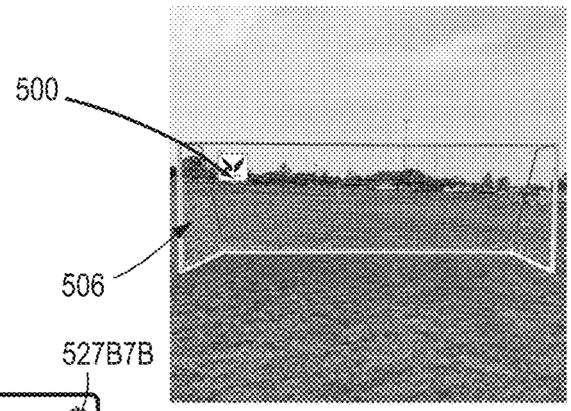
FIG. 5E

SIGNAGE SYSTEM FOR SPORTS NETTING

BACKGROUND OF INVENTION

1. Field of Invention

This invention relates generally to labels for display of various types of indicia. More specifically, at least one embodiment, relates to a signage system for sports netting.

2. Discussion of Related Art

Given the size of the sports memorabilia market, there is significant interest in the marketplace for unique tangible items having a direct association with a sporting event or athlete. Historically, these items are created organically, for example, a folding chair that was removed from an arena or other venue prior to the renovation or demolition of the venue, an item of athletic equipment that was used during an event or a photograph that captures a defining moment of a game or other sporting event. However, this approach greatly limits the volume of memorabilia that is available to collect and to sell.

Historically, net labeling is secured using snaps or elements that are sewn to the label. However, these approaches can injury athletes who come in contact with the nets during game-play because they include sharp edges and also prevent the signage from being pulled off and released from the net.

SUMMARY OF INVENTION

Therefore, there is a need for apparatus, systems and methods that provide sports memorabilia by allowing items to be integrated into an athletic/sporting event or a sports venue on a temporary basis. These items can be included prior to a start of the event or during a break in game-play. For example, an item of sports memorabilia can be secured to a scorer's table, a goal or a net used during the event. In various embodiments, the item can include any of logos, text and art work including branding, promotional or marketing messages. According to one aspect a signage attachment system is employed for a temporary attachment of signage to a sports net. The signage is easily removed to provide an item of collectible sports memorabilia that has an attractive construction and design that can be sold, auctioned or gifted as in-game used memorabilia. According to further embodiments, the signage has a unique style and shape that results in an item of memorabilia that is suitable for display (for example, when placed in a frame or other form of display). In still further embodiments, the shape and form of the signage provides an item of sports memorabilia includes a surface that can easily receive the signature of a player or coach.

According to some aspects, a universal net signage and net label system is provided. In various embodiments, the net signage system provides a secure attachment that limits a length of net cord that is in contact with the fastening element of the signage system when the system is secured to the sports netting. Because these embodiments reduce the amount of net cord that is covered to secure the signage system, they have improved utility when used with nets when compared with prior approaches. For example, where a basketball net has antimicrobial and/or moisture wicking properties, the increase in the amount of net cord surface that remains exposed behind the signage system assists in maintaining the effectiveness of the antimicrobial and/or moisture wicking properties of the net because more of the net cord material is available to contact the basketball as it passes through the net.

The secure attachment is also releasable in a manner that will not damage the net or harm an athlete who contacts the net signage system (for example, when used on a basketball net where an athlete leaps into the air and their hand contacts the net). These embodiments can be manufactured with a rigid but flexible material that also eliminates sharp edges. According to one embodiment, the net signage system includes a single 3D printed element with channel based fastening hardware included on the rear side and signage such as a logo or other branding or messaging included on the front side during manufacture. According to another embodiment, the net signage system is manufactured using injection molding. In various of these embodiments, the materials of manufacture are waterproof to provide a durable label for display of messaging that does not wash away or fade over time. According to these embodiments, the net signage system is suitable for indoor and outdoor use.

According to another embodiment, the net signage system includes a backing piece that is secured to the sports netting and a separate label that includes printed material such as artwork, messaging and/or logos. This approach allows the label (or "signage piece") including the printed material to be removed and replaced while the backing piece remains securely attached to the net. According to one embodiment, channel-based fastening hardware is included on the rear side of the backing piece.

According to still further embodiments, a signage attachment system for sports netting allows for standardization across different categories of sports netting (for example, basketball nets, tennis nets, lacrosse nets, etc.) to provide added versatility. That is, where the openings in the different categories of sports netting have similar sizes, the same size backing piece, or alternatively, single-piece signage attachment system can be secured to nets across the different categories. According to these embodiments, a universally sized and spaced channel-based fastening system can be employed with nets in the different categories of nets. The universal signage attachment system can be used a plurality of categories of sports netting without modification.

Various of the embodiments illustrated and described herein, greatly reduce or eliminate user error in affixing the signage system to a net Eliminating the variability results in an improved quality in how the signage is displayed. For example, it can reduce or eliminate deformation in the shape of the label or other signage. That is, if the signage is intended to have a square shape it will be displayed as a square shape. This also ensures that the messaging displayed on the signage is visible on the surface of the net as intended, and further, that the messaging is not deformed or obscured because of a misalignment of the signage when attached to the net.

Embodiments of the signage attachment system illustrated and described herein also allow the signage to scale up and down in size using a standardized net-fastening system. These embodiments provide a standardized approach to securing the signage to a net regardless of the size, shape or orientation of the signage.

In one aspect, a signage system for a sports net is provided where the sports net includes a plurality of cords. The signage system includes a front surface configured for a display of indicia including at least one of text and graphics, a rear surface and a plurality of fasteners coupled to the rear surface, each of the plurality of fasteners including a channel configured to receive a cord included in the plurality of cords. The plurality of fasteners are positioned at locations of the rear surface to secure to a plurality of different cords included in the plurality of cords. In some embodiments, the signage system includes a body including the front surface and the rear surface where the body and the plurality of fasteners are manufactured using a thermoplastic polyurethane material. In a further embodiment, the body and the plurality of fasteners are 3D printed.

According to another embodiment, a signage system for a sports net is provided where the sports net includes a plurality of cords. The signage system includes a backing piece including a front surface including a first adhesive region, a rear surface and a plurality of fasteners coupled to the rear surface, each of the plurality of fasteners including a channel configured to receive a cord included in the plurality of cords. The signage system also includes a display piece including a front surface configured for a display of indicia including at least one of text and graphics, and a rear surface including a second adhesive region, the second adhesive region configured to be temporarily secured to the first adhesive region.

According to various embodiments, the geometry of construction of a label for sports netting provides a shape that is beneficial to maintaining a long life of the sports net through a repeated application of a label in the same region of the netting. That is, to provide the label with a shape that allows the label to be securely attached to the net while avoiding contact between the adhesive regions and the net.

According to one aspect, a label configured to attach to sports netting is provided. The label can be employed to provide durable, removable labels that can include custom branding and be secured to a sports net to create an item of sports memorabilia. Depending on the embodiment, the label can be attached to netting such as a basketball net, a soccer net, a tennis net, a volleyball net, a lacrosse net or a field hockey net as some examples.

According to some embodiments, the removable labels include a brand for marketing purposes. That is, the labels can promote a brand that is displayed for the period that the label is affixed to the net. A goal net is often the focal point for fans whether they are in attendance or viewing the game via television/video. Consequently, marketing indicia included on a label secured to the net receives repeated views by the fans. Various embodiments allow for durable labels that are easily and securely fastened to a basketball net or other sports netting without the use of tools. Further, any form of indicia can be printed on the front surface of the label. These can include alpha-numeric text as well as art work. According to one embodiment, the logo or other indicia are applied to the front surface of the label using heat transfer technology. Application of the logo via alternate methods, for example, screen printing or an application of a patch with an adhesive can also be employed depending on the embodiment. These embodiments are also constructed so that the label does not interfere with game play and can quickly be removed by hand without the use of tools. The labels are also constructed to securely attach to the sports net such that the label does not pose a risk of injury to the players while also not interfering with the performance of the net.

According to some embodiments, a label includes a body having a front surface configured to display graphics with the label attached to the sports netting and a rear surface including a central adhesive region, a plurality of tabs extending radially outward from the body, and a plurality of foldable regions wherein each of the plurality of tabs is connected to the body by one of the plurality of foldable regions, respectively. In these embodiments, each of the plurality of tabs have a rear surface including a second adhesive region, respectively. Each of the plurality of foldable regions includes an adhesive-free rear surface configured to contact the sports netting with the label securely attached to the sports netting. The central adhesive region and each of the respective second adhesive regions are sized and located such that contact is absent between the adhesive regions and the sports netting with the label securely attached to the sports netting. According to one embodiment, each of the plurality of tabs is defined by an edge that extends from a first attachment to the body at a first end of one of the plurality of foldable regions to a second attachment to the body at a second end of the one of the plurality of foldable regions where the edge forms an acute angle at a distal end of the tab. In some embodiments, the edge forms an obtuse angle at the first attachment to the body, and the edge forms an obtuse angle at the second attachment to the body.

According to another embodiment, a label is provided where the label is configured to attach to sports netting. The label includes a body including a front surface configured to display graphics with the label attached to the sports netting and a rear surface including a central adhesive region. The label also includes a plurality of tabs extending radially outward from the body, each of the plurality of tabs having a rear surface including a second adhesive region, respectively, and a plurality of foldable regions wherein each of the plurality of tabs is connected to the body by one of the plurality of foldable regions, respectively, each of the plurality of foldable regions including an adhesive-free rear surface. The label includes a label outer edge, and a plurality of fold lines each of the plurality of fold lines defined as a linear region substantially centered in one of the plurality of foldable regions and extending between a first intersection with the label outer edge and a second intersection with the label outer edge, respectively. According to another embodiment, the respective fold lines are located in a non-central region of the foldable regions. According to one embodiment, each of the plurality of tabs is defined by an acute triangle formed in a region between one of the plurality of fold lines, a first portion of the label outer edge that extends from the first intersection to a distal end of the respective tab and a second portion of the label edge that extends from the second intersection to the distal end, where the first portion and the second portion meeting at an acute angle.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 5A-5E illustrate a label in accordance with a fifth embodiment;

DETAILED DESCRIPTION

Figure 1A:
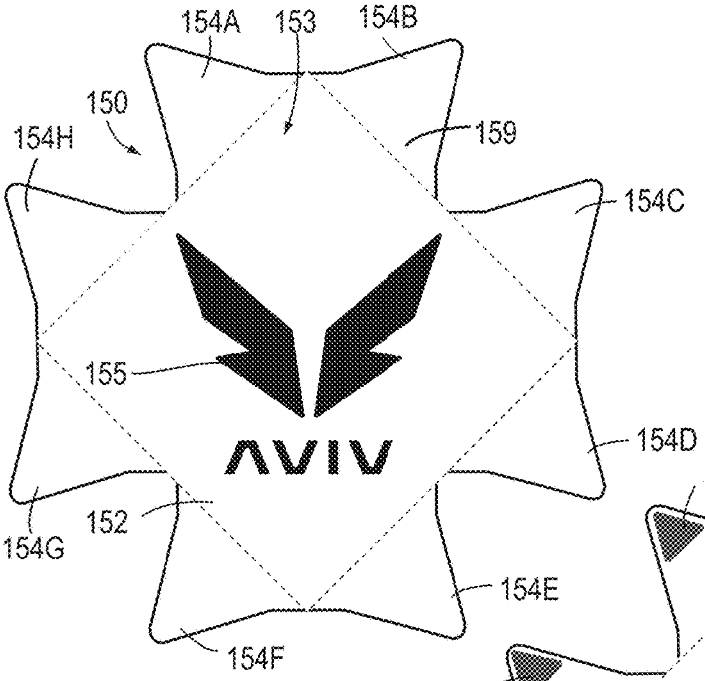
FIGS. 1A-1C illustrate a label in accordance with a first embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Today, the branding of teams and athletes is a huge part of creating value in any item of sports memorabilia. FIGS. 1-14 illustrate various durable, removable labels that can include custom branding and be secured to various types of sports netting to create an item of sports memorabilia. According to some embodiments, the removable labels include a brand for marketing purposes. That is, the labels can promote a brand that is displayed for the period that the label is affixed to the net. The net is often a focal point for fans whether they are in attendance or viewing the game via television/video. Consequently, marketing indicia included on a label secured to the net will receive repeated views by the fans. Various embodiments allow for durable labels that are easily and securely fastened to a basketball net. Further, any form of indicia can be printed on the front surface of the label. These can include alpha and numeric text as well as art work. According to one embodiment, the logo or other indicia are applied to the front surface of the label using heat transfer technology. Application of the logo via alternate methods, for example, screen printing or an application of a patch with an adhesive can also be employed depending on the embodiment. These embodiments are also constructed so that the label does not interfere with game play and can quickly be removed by hand without using any tools. The labels are also constructed to securely attach to the net such that the label does not pose a risk of injury to the players while also not interfering with the performance of the net.

Figure 1B:
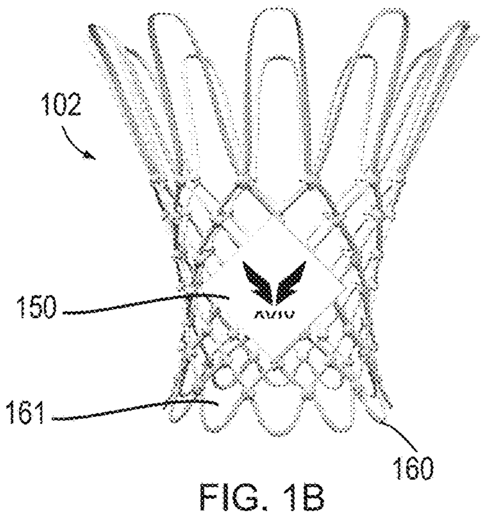
Figure 1C:
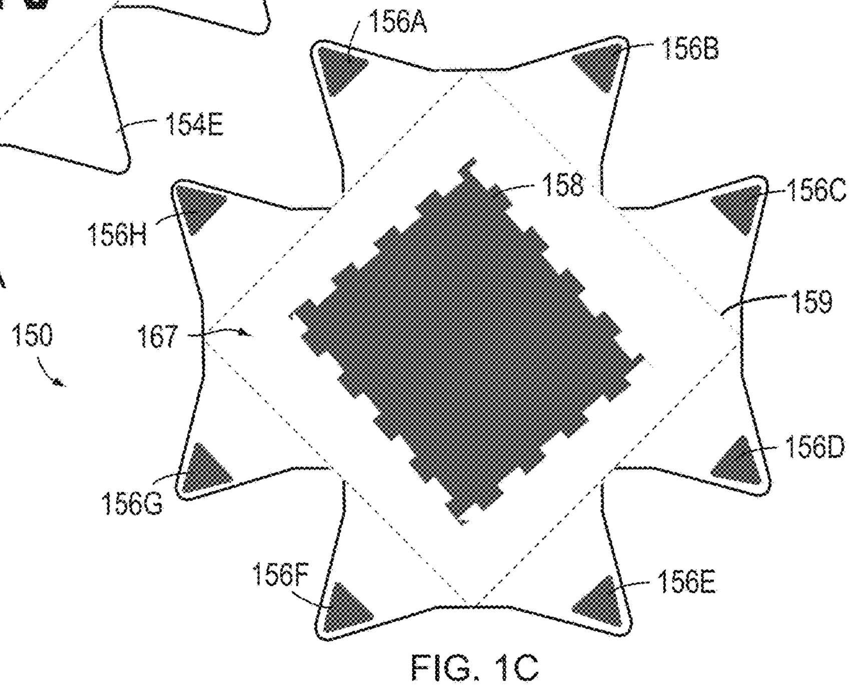

Referring now to FIGS. 1A-1C, a label is illustrated in accordance with a first embodiment. FIG. 1A illustrates a front view of the label 150. The label 150 includes a body 152, a front surface 153, a plurality of tabs 154A-154H and a plurality of fold lines 159A-159H. According to the illustrated embodiment, the body 152 is defined by the plurality of fold lines 159A-159H. The body 152 has an overall shape of a parallelogram in the illustrated embodiment. For example, the fold lines 159A and 159H combine to form a first side of the body 152, the fold lines 159B and 159C combine to form a second side of the body, the fold lines 159D and 159E combine to form a third side of the body, and the fold lines 159F and 159G combine to form a fourth side of the body. Two of the plurality of tabs 154A-154H, respectively, extend outward from each side of the body. A logo 155 is centrally located on the front surface 153.

FIG. 1B illustrates a rear view of the label 150 including a rear surface 157. As viewed from the rear, the label 150 also includes a plurality of adhesive regions 156A-156H each adhesive region located on the rear surface of one of the plurality of tabs 154A-154H, respectively. The label 150 also includes a central adhesive region 158 located on the rear surface 157. According to an alternate embodiment, separate adhesive regions are located on the rear surface 157, for example, a separate adhesive region can be located on the rear surface of the body 152 to engage one of the plurality of adhesive regions 156A-156H, respectively. The plurality of fold lines 159A-159H are illustrated from the rear of the label 150 in FIG. 1B.

Referring to FIG. 1C, the label 150 is secured to a sports netting 102 according to one embodiment. The sports netting 102 includes a plurality of strings 160 that are secured together, (for example, knotted) to form a series of openings 161 in the sports netting 102. According to one embodiment, the sports netting 102 is a basketball net included in a basketball goal. According to other embodiments, the sports netting 102 includes another type of sports netting, for example, a basketball net, a soccer net, a tennis net, a volleyball net, a lacrosse net or a field hockey net.

In operation, each of the respective tabs 154A-154H is folded rearward along the respective fold line to secure around a string included in a sports netting. Where a single central adhesive region 158 is employed each of the tabs secures to a separate portion of the single central adhesive region 158. Further, a separate section of the string 160 is enclosed between each tab and the body 152 along the respective fold line when the tabs are folded backwards to place each of the plurality of tabs 154A-154H, respectively, in contact with the rear side of the label 152. According to this embodiment, the rearward fold allows each of the plurality of adhesive regions 156A-156H to be placed in contact with the central adhesive region 158. In various embodiments, the bond formed between the each of the respective plurality of adhesive regions 156A-156H and the central adhesive region 158 is secure but temporary. According to various embodiments, VELCRO hook and loop style fastening material is employed for each of the plurality of adhesive regions 156A-156H and the central adhesive region 158. In various embodiments, other forms of adhesive or other forms of fastening can be employed.

Again, referring to FIG. 1C, the label 150 is secured to the strings 160. The strings 160 are trapped within the fold formed when a tab 154A-154H is folded backward and pressed into engagement with the rear of the body 152. Further, the configuration illustrated in FIGS. 1A-1C allows eight separate sections of string 160 to be secured within the folds of the label 150. When attached as illustrated, the front surface 153 of the body 152 is unobstructed when viewed from the front of the net. The logo 155 is clearly displayed with the label attached to the net. Further, the manner of attachment provides the label with a secure but temporary attachment at each of the tabs 154A-154H. In these embodiments, the attachment is made without requiring any tools or fastening hardware. The label 150 can also be removed by hand and without the use of tools.

According to various embodiments, the dimensions of the shapes, size and locations of the respective adhesive regions are established to allow the string 160 to be securely enclosed along the fold lines 159A-159H when the tabs 154A-154H are folded rearward while avoiding contact between the string 160 and either the central adhesive region 158 or any of the plurality of adhesive regions 156A-156H. Applicant finds that this prevents damage to the string 160 that would otherwise occur.

Figure 2A:
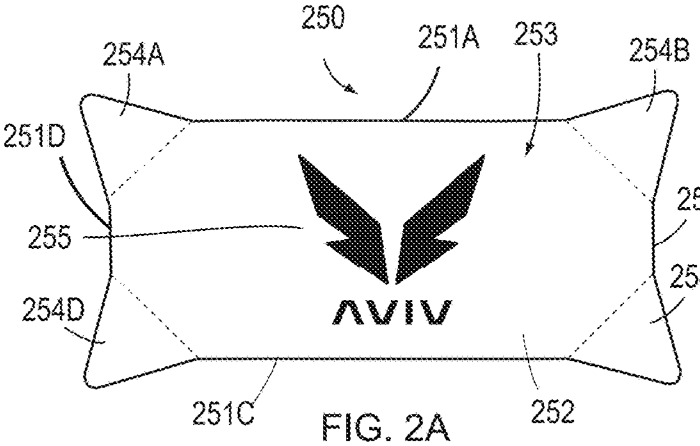
FIGS. 2A-2C illustrate a label in accordance with a second embodiment.
Figure 2C:
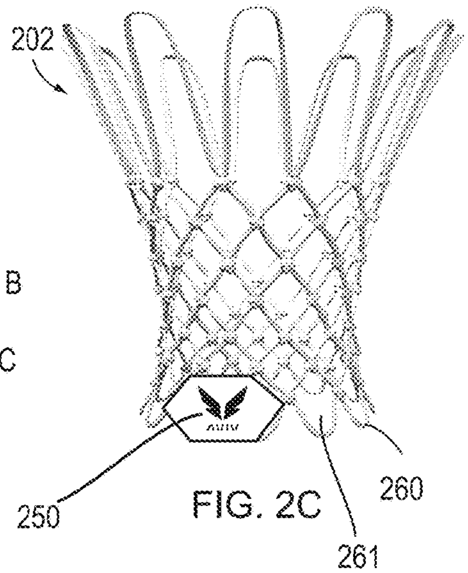
Figure 2B:
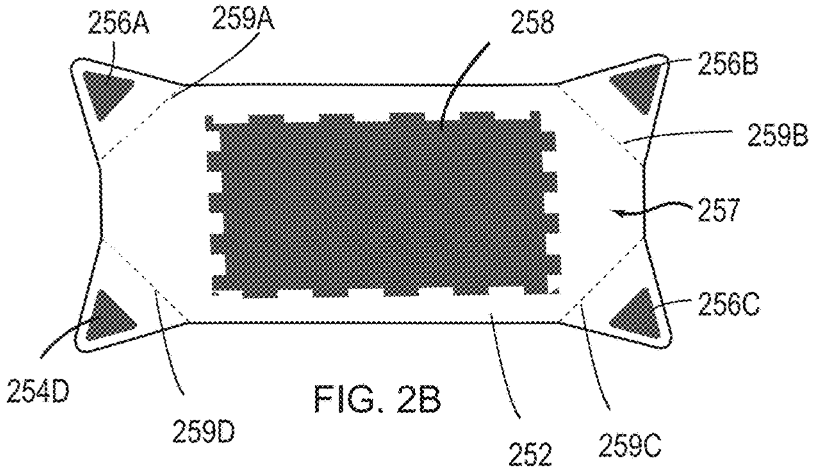

Referring now to FIGS. 2A-2C, a label is illustrated in accordance with a second embodiment. FIG. 2A illustrates a front view of the label 250. The label 250 includes a body 252, a front surface 253, a plurality of tabs 254A-254D and a plurality of fold lines 259A-259D. The label 250 also includes a plurality of straight edges 251A-251D. According to the illustrated embodiment, the body 252 is defined by the region enclosed by the plurality of straight edges 251A-251D and the plurality of fold lines 259A-259H. The body 252 has an overall shape of an elongated octagon in the illustrated embodiment. A single one of the of the plurality of tabs 254A-254D, respectively, extend outward from each corner of the body 252. A logo 255 is centrally located on the front surface 253.

FIG. 2B illustrates a rear view of the label 250 including a rear surface 257. As viewed from the rear, the label 250 also includes, a plurality of adhesive regions 256A-256D each adhesive region located on the rear surface of one of the plurality of tabs 254A-254D, respectively. The label 250 also includes a central adhesive region 258 located on the rear surface 257. According to an alternate embodiment, separate adhesive regions are located on the rear surface 257, for example, a separate adhesive region can be located on the rear surface 257 to engage one of the plurality of adhesive regions 256A-256H, respectively. The plurality of fold lines 259A-259H are illustrated from the rear of the label 250 in FIG. 2B.

Referring to FIG. 2C, the label 250 is secured to a sports netting 202 according to one embodiment. The sports netting 202 includes a plurality of strings 260 that are secured together, (for example, knotted) to form a series of openings 261 in the sports netting 202. According to one embodiment, the sports netting 202 is a basketball net included in a basketball goal. According to other embodiments, the sports netting 202 includes another type of sports netting, for example, a basketball net, a soccer net, a tennis net, a volleyball net, a lacrosse net or a field hockey net.

In operation, each of the respective tabs 254A-254D is folded rearward along the respective fold line to secure around a string included in a sports netting. Where a single central adhesive region 258 is employed each of the tabs secures to a separate portion of the single central adhesive region 258. In other embodiments, each of the plurality of adhesive regions 256A-256D secures to a respective one of a plurality of adhesive regions located on the rear surface of the body 252. Further, a separate section of the string 260 is enclosed between each tab and the body 252 along the respective fold line when the tabs are folded backwards to place each of the plurality of tabs 254A-254D, respectively, in contact with the rear side of the label 252. According to this embodiment, the rearward fold allows each of the plurality of adhesive regions 256A-256D to be placed in contact with the central adhesive region 258. In various embodiments, the bond formed between the each of the respective plurality of adhesive regions 256A-256D and the central adhesive region 258 is secure but temporary. According to various embodiments, VELCRO hook and loop style fastening material is employed for each of the plurality of adhesive regions 256A-256D and the central adhesive region 258. In various embodiments, other forms of adhesive or other forms of fastening can be employed.

Again, referring to FIG. 2C, the label 250 is secured to the strings 260. The strings 260 are trapped within the fold formed when a tab 254A-254D is folded backward and pressed into engagement with the rear of the body 252. Further, the configuration illustrated in FIGS. 2A-2C allows four separate sections of string 260 to be secured within the folds of the label 250. When attached as illustrated, the front surface 253 of the body 252 is unobstructed when viewed from the front of the net. The logo 255 is clearly displayed with the label attached to the net. Further, the manner of attachment provides the label with a secure but temporary attachment at each of the tabs 254A-254D. In these embodiments, the attachment is made without requiring any tools or fastening hardware. The label 250 can also be removed by hand and without the use of tools.

According to various embodiments, the dimensions of the shapes, size and locations of the respective adhesive regions are established to allow the string 260 to be securely enclosed along the fold lines 259A-259D when the tabs 254A-254D are folded rearward while avoiding contact between the string 260 and either the central adhesive region 258 or any of the plurality of adhesive regions 256A-256D. Applicant finds that this prevents damage to the string 260 that would otherwise occur.

Figure 3A:
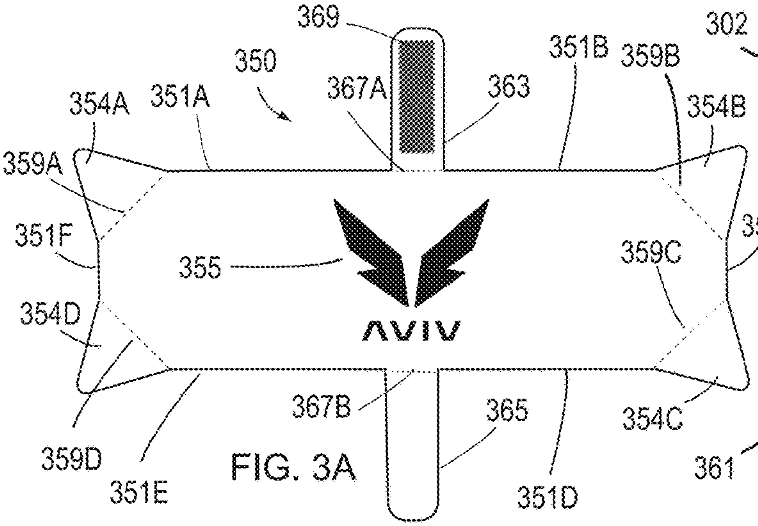
FIGS. 3A-3C illustrate a label in accordance with a third embodiment.
Figure 3C:
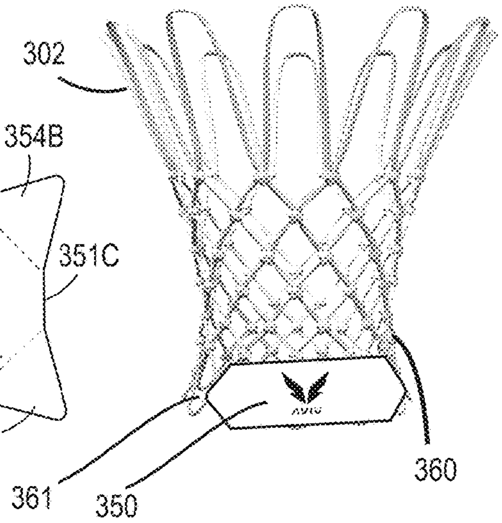
Figure 3B:
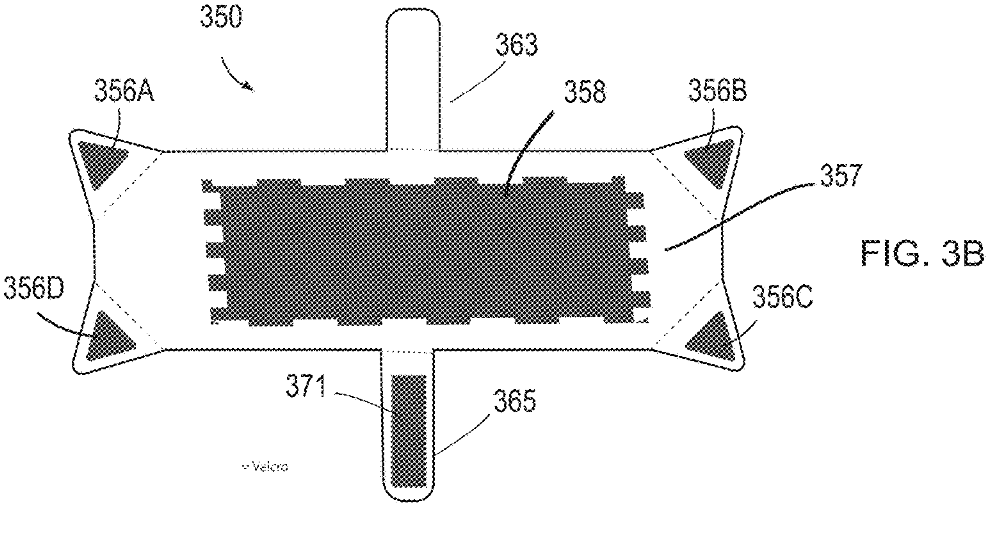

Referring now to FIGS. 3A-3C, a label 350 is illustrated in accordance with a third embodiment. Apart from some additional features described in detail below, the label 350 has an overall design that is generally similar to the label 250 illustrated and described with reference to FIGS. 2A-2C. FIG. 3A illustrates a front view of the label 350. The label 350 includes a body 352, a front surface 353, a plurality of corner tabs 354A-354D and a plurality of fold lines 359A-359D. A single one of the of the plurality of tabs 354A-354D, respectively, extend outward from each corner of the body 352. A logo 355 is centrally located on the front surface 353. The label 350 also includes a first side tab 363 extending from a first longitudinal edge of the label 350 and a second side tab 365 extending from a second longitudinal edge of the label 350. The first side tab 363 is attached to the body 352 at a first side-tab fold line 367A. The second side tab 365 is attached to the body 352 at a second side-tab fold line 367B. The first side-tab 363 includes a first side-tab adhesive region 369 located on a front surface of the first side-tab 363. As illustrated in FIG. 3B, the second side-tab 365 includes a second side-tab adhesive region 371 located on a rear surface of the second side-tab 365.

The label 350 also includes a plurality of straight edges 351A-351F. According to the illustrated embodiment, the size and shape of the body 352 is generally defined by the region enclosed by the plurality of straight edges 351A-351F, the plurality of fold lines 359A-359H and the plurality of side-tab fold lines 367A-367B. The body 352 has an overall shape of an elongated octagon in the illustrated embodiment.

FIG. 3B illustrates a rear view of the label 350 including a rear surface 357. As viewed from the rear, the label 350 also includes, a plurality of adhesive regions 356A-356D each adhesive region located on the rear surface of one of the plurality of tabs 354A-354D, respectively. The label 350 also includes a central adhesive region 358 located on the rear surface 357. According to an alternate embodiment, separate adhesive regions are located on the rear surface 357, for example, a separate adhesive region can be located on the rear surface 357 to engage one of the plurality of adhesive regions 356A-356H, respectively. The second side-tab adhesive region 371 is located on a rear surface of the second side-tab 365. The pluralities of fold lines 359A-359H and 367A-367B are illustrated from the rear of the label 350 in FIG. 3B Referring to FIG. 3C, the label 350 is secured to a sports netting 302 according to one embodiment. The sports netting 302 includes a plurality of strings 360 that are secured together, (for example, knotted) to form a series of openings 361 in the sports netting 302. According to one embodiment, the sports netting 302 is a basketball net included in a basketball goal. According to other embodiments, the sports netting 302 includes another type of sports netting, for example, a basketball net, a soccer net, a tennis net, a volleyball net, a lacrosse net or a field hockey net.

In operation, each of the respective tabs 354A-354D is folded rearward along the respective fold line to secure around a string included in a sports netting as described above with reference to the second embodiment. In addition, the first side-tab 363 and the second side-tab 365 are folded rearward around separate strings 360 included in the sports netting 302. This places the front surface of the first side-tab 363 in contact with the rear surface of the second side-tab 365. The first side-tab adhesive region 369 contacts the second side-tab adhesive region 371 make contact. When the two side-tabs 363, 365 are pressed together, the adhesive regions provide a durable, temporary attachment of the two sides tabs. According to various embodiments, VELCRO hook and loop style fastening material is employed for each of the first side-tab adhesive region 369 and the second side-tab adhesive region 371. In other embodiments, other forms of adhesive or other forms of fastening can be employed to allow the two side-tabs 363, 365 to secure to one another.

Again, referring to FIG. 3C, the label 350 is secured to the strings 360. The strings 360 are trapped within the fold formed when a tab 354A-354D is folded backward and pressed into engagement with the rear of the body 352. Further, the configuration illustrated in FIGS. 3A-3C allows six separate sections of string 360 to be secured within the folds of the label 350. When attached as illustrated, the front surface 353 of the body 352 is unobstructed when viewed from the front of the net. The logo 355 is clearly displayed with the label attached to the net. Further, the manner of attachment provides the label with a secure but temporary attachment at each of the corner-tabs 354A-354D and each of the side-tabs 363 and 365. In these embodiments, the attachment is made without requiring any tools or fastening hardware. The label 350 can also be removed by hand and without the use of tools.

According to various embodiments, the dimensions of the shapes, size and locations of the respective adhesive regions are established to allow the string 360 to be securely enclosed along the fold lines 359A-359D and the side-tab fold lines 367A-367B when the corner-tabs 354A-354D and the side-tabs 363, 365 are folded rearward while avoiding contact between the string 360 and either the central adhesive region 358 or any of the plurality of adhesive regions 356A-356D, 369 and 371. Applicant finds that this prevents damage to the string 360 that would otherwise occur.

Figure 4E:
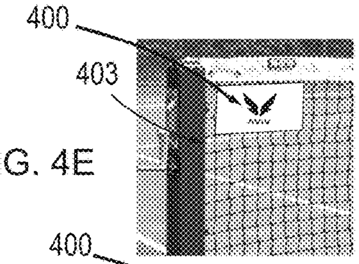
FIGS. 4A-4G illustrate a label in accordance with a fourth embodiment.
Figure 4F:
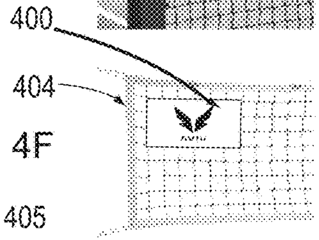
Figure 4G:
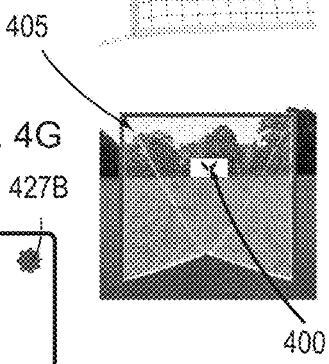
Figure 4A:
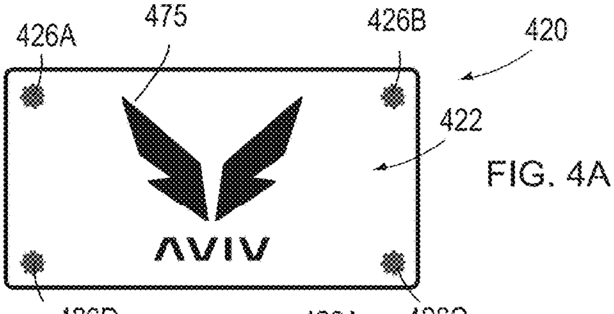
Figure 4B:
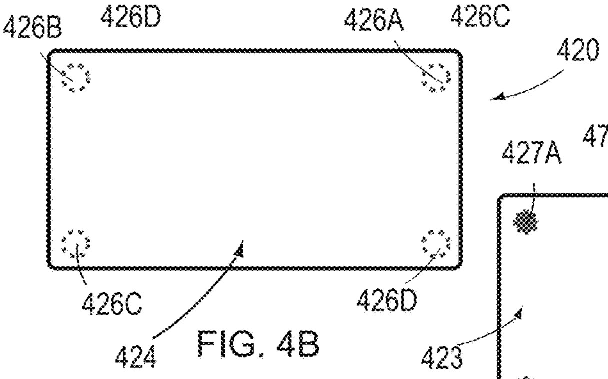
Figure 4C:
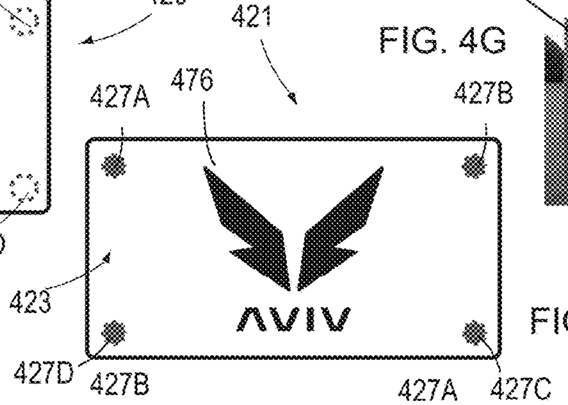
Figure 4D:
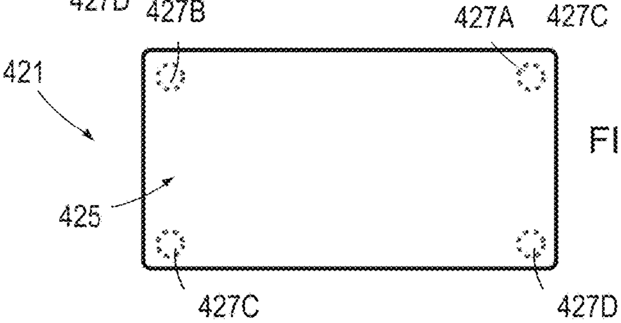

Referring now to FIGS. 4A-4G a label system 400 is illustrated in accordance with a fourth embodiment. The label system 400 includes a first label 420 and a second label 421 each having a rectangular overall shape and identical dimensions. In general, the label system 400 includes two labels that are secured to a sports netting and attached to one another back-to-back. When attached to a net these embodiments provide a label system 400 including a two sided label assembled by hand to secure to the net. The overall label system 400 provides two exposed surfaces each suitable for the display of logos, text, graphics or other indicia. According to the illustrated embodiment, the label system 400 provides a two sided label having an overall rectangular shape when fully assembled. FIGS. 4A and 4B illustrate a front side of the first label 420 and a rear side of the first label 420, respectively. FIGS. 4C and 4D illustrate a front side of the second label 421 and a rear side of the second label 421, respectively.

Referring to FIG. 4A, the front side of the first label 420 includes a front surface 422, and a first plurality of fasteners 426A-426D. A logo 475 is located on the front surface of the first label 420. According to the illustrated embodiment, the first plurality of fasteners 426A-426D include through-fasteners that extend from the front side of the first label 420 to the rear side of the first label 420, for example, snaps. According to one embodiment, a through-fastener is located in each corner of the first label 420.

Referring to FIG. 4B, the rear side of the first label 420 includes a rear surface 424, and the first plurality of fasteners 426A-426D. According to the illustrated embodiment, the rear side of each of the first plurality of fasteners 426A-426D extends through first label 420 from the front to the back such that a rear side of each of the first plurality of fasteners 426A-426D is accessible from the back of the label. As is described in greater detail below, the respective ends of the first plurality of fasteners 426A-426D are suitable for attaching to respective ends of corresponding fasteners accessible at the back of the second label 421. According to one embodiment, the fasteners are snaps. According to an alternate embodiment, a different style fastener, for example, VELCRO is employed. According to these embodiments, the first plurality of fasteners 426A-426D are only accessible on the rear side of the first label 420.

Referring to FIG. 4C, the front side of the second label 421 includes a front surface 423, and a second plurality of fasteners 427A-427D. A logo 476 is located on the front surface of the second label 421. According to the illustrated embodiment, the second plurality of fasteners 427A-427D include through-fasteners that extend from the front side of the second label 421 to the rear side of the second label 421, for example, snaps. According to one embodiment, a through-fastener is located in each corner of the second label 421.

Referring to FIG. 4D, the rear side of the second label 421 includes a rear surface 425, and the second plurality of fasteners 427A-427D. According to the illustrated embodiment, the rear side of each of the second plurality of fasteners 427A-427D extends through second label 421 from the front to the back such that a rear side of each of the second plurality of fasteners 427A-427D is accessible from the back of the label. As is described in greater detail below, the respective ends of the second plurality of fasteners 427A-427D are suitable for attaching to respective ends of corresponding fasteners accessible on the back of the first label 420. According to an alternate embodiment, a different style fastener, for example, VELCRO is employed. According to these embodiments, the second plurality of fasteners 427A-427D are only accessible on the rear side of the second label 421.

In operation, the label system 400 is applied to sports netting by sandwiching the sports netting between the first label 420 and the second label 421. The label system 400 is assembled with the respective rear surfaces 424 and 425 facing one another, the labels 420, 421 are aligned with the netting such that the first plurality of fasteners 426A-426D and 427A-427D are located in respective openings within the net. The fasteners are pressed together to attach the first label 420 and the second label 421. The label system 400 is then securely and temporarily attached to the sports netting. This is accomplished without the use of tools. The label system 400 is also easily removed without the use of tools.

Referring to FIGS. 4E-4G, the label system 400 is illustrated when employed with different types of sports netting. FIG. 4E illustrates the label system 400 employed with a tennis net 403. FIG. 4F illustrates the label system 400 employed with a volleyball net 404. FIG. 4G illustrates the label system 400 employed with a lacrosse net 405. The label provides a two sided display positioned for high visibility in each of these embodiments.

Referring now to FIGS. 5A-5E a label system 500 is illustrated in accordance with a fifth embodiment. The label system 500 includes a first label 520 and a second label 521. In general, the label system 500 includes two labels that are secured to a sports netting and attached to one another back-to-back. When attached to a net these embodiments provide a label system 500 including a two sided label assembled by hand when it is secured to the net. The overall label system 500 provides two exposed surfaces each suitable for the display of logos, text, graphics or other indicia. According to the illustrated embodiment, the label system 500 provides a two sided label having an overall square shape. FIGS. 5A and 5B illustrate a front side of the first label 520 and a rear side of the first label 520, respectively. FIGS. 5C and 5D illustrate a front side of the second label 521 and a rear side of the second label 521, respectively.

Referring to FIG. 5A, the front side of the first label 520 includes a front surface 522, and a first plurality of fasteners 526A-526D. A logo 575 is located on the front surface of the first label 520. According to the illustrated embodiment, the first plurality of fasteners 526A-526D include through-fasteners that extend from the front side of the first label 520 to the rear side of the first label 520, for example, snaps. According to one embodiment, a through-fastener is located in each corner of the first label 520, for example, a snap.

Referring to FIG. 5B, the rear side of the first label 520 includes a rear surface 524, and the first plurality of fasteners 526A-526D. According to the illustrated embodiment, the rear side of each of the first plurality of fasteners 526A-526D extends through first label 520 from the front to the back such that a rear side of each of the first plurality of fasteners 526A-526D is accessible from the back of the label, for example, snaps. As is described in greater detail below, the respective ends of the first plurality of fasteners 526A-526D are suitable for attaching to respective ends of corresponding fasteners accessible at the back of the second label 521. According to an alternate embodiment, a different style fastener, for example, VELCRO is employed. According to these embodiments, the first plurality of fasteners 526A-526D are only accessible on the rear side of the first label 520.

Referring to FIG. 5C, the front side of the second label 521 includes a front surface 523, and a second plurality of fasteners 527A-527D. A logo 576 is located on the front surface of the second label 521. According to the illustrated embodiment, the second plurality of fasteners 527A-527D include through-fasteners that extend from the front side of the second label 521 to the rear side of the second label 521, for example, snaps. According to one embodiment, a through-fastener is located in each corner of the second label 521.

Referring to FIG. 5D, the rear side of the second label 521 includes a rear surface 525, and the second plurality of fasteners 527A-527D. According to the illustrated embodiment, the rear side of each of the second plurality of fasteners 527A-527D extends through second label 521 from the front to the back such that a rear side of each of the second plurality of fasteners 527A-527D is accessible from the back of the label, for example, snaps. As is described in greater detail below, the respective ends of the second plurality of fasteners 527A-527D are suitable for attaching to respective ends of corresponding fasteners accessible on the back of the first label 520. According to an alternate embodiment, a different style fastener, for example, VELCRO is employed. According to these embodiments, the second plurality of fasteners 527A-527D are only accessible on the rear side of the second label 521.

In operation, the label system 500 is applied to sports netting by sandwiching the sports netting between the first label 520 and the second label 521. The label system 500 is assembled with the respective rear surfaces 524 and 525 facing one another, the labels 520, 521 are aligned with the netting such that the first plurality of fasteners 526A-526D and the second plurality of fasteners 527A-527D are located in respective openings within the net. The fasteners are pressed together to attach the first label 520 and the second label 521, for example, snapped together. The label system 500 is then securely and temporarily attached to the sports netting. This is accomplished without the use of tools. The label system 500 is also easily removed without the use of tools.

Referring to FIG. 5E, the label system 500 is illustrated when employed with a soccer net 506 included in the goal. For example, the first label 520 is located on the front side at the rear of the net with the logo 575 facing forward toward the center circle of the field. The second label 521 is located on the rear side of the net directly opposite and adjacent to the first label 520. With the two labels 520, 521 properly aligned, the first plurality of fasteners 526A-526D and the second plurality of fasteners 527A-527D are aligned at the back of the respective labels. Further, the two labels are also aligned such that the first plurality of fasteners 526A-526D and the second plurality of fasteners 527A-527D are aligned at openings within the soccer net 506. The fasteners are pressed together (for example, snapped) to secure the labels 520, 521 to one another. With the label system 500 attached, the logo 575 faces toward the playing field where it is visible to anyone viewing the front of the goal. The logo 576 faces toward the goal line where it is visible to anyone viewing the rear of the goal. These embodiments provide a label with a large square two sided display positioned for high visibility.

Figure 6A:
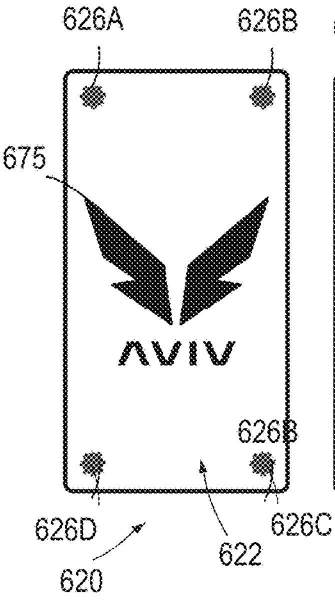
FIGS. 6A-6G illustrate a label in accordance with a sixth embodiment.
Figure 6B:
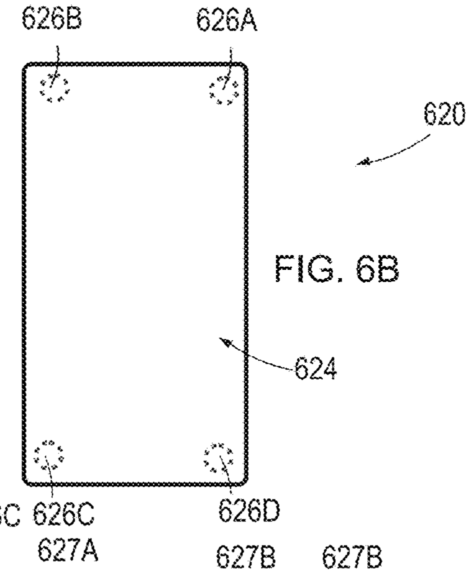
Figure 6E:
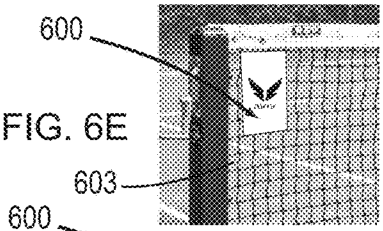
Figure 6F:
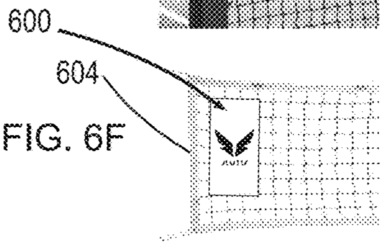
Figure 6G:
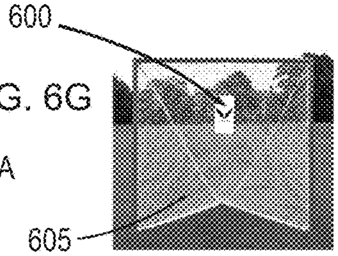
Figure 6C:
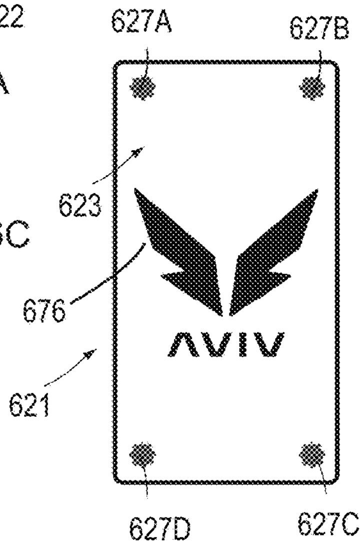
Figure 6D:
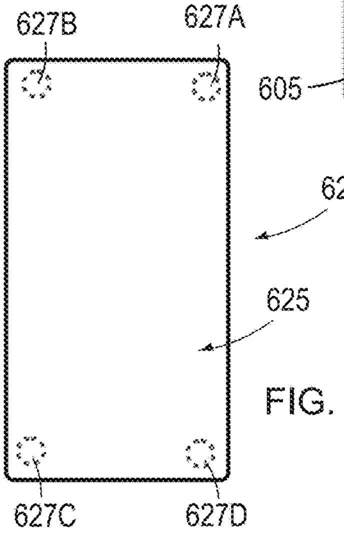

Referring now to FIGS. 6A-6G a label system 600 is illustrated in accordance with a sixth embodiment. In general, the label system 600 is comparable to the label system 400 illustrated and described with reference to FIGS. 4A-4G but in a vertical orientation. The label system 600 includes a first label 620 and a second label 621. In general, the label system 600 includes two labels that are secured to a sports netting and attached to one another back-to-back. When attached to a net these embodiments provide a label system 600 including a two sided label assembled by hand when it is secured to the net. The overall label system 600 provides two exposed surfaces each suitable for the display of logos, text, graphics or other indicia. According to the illustrated embodiment, the label system 600 provides a two sided label having an overall rectangular shape. FIGS. 6A and 6B illustrate a front side of the first label 620 and a rear side of the first label 620, respectively. FIGS. 6C and 6D illustrate a front side of the second label 621 and a rear side of the second label 621, respectively.

Referring to FIG. 6A, the front side of the first label 620 includes a front surface 622, and a first plurality of fasteners 626A-626D. A logo 675 is located on the front surface of the first label 620. According to the illustrated embodiment, the first plurality of fasteners 626A-626D include through-fasteners that extend from the front side of the first label 620 to the rear side of the first label 620, for example, snaps. According to one embodiment, a through-fastener is located in each corner of the first label 620.

Referring to FIG. 6B, the rear side of the first label 620 includes a rear surface 624, and the first plurality of fasteners 626A-626D. According to the illustrated embodiment, the rear side of each of the first plurality of fasteners 626A-626D extends through first label 620 from the front to the back such that a rear side of each of the first plurality of fasteners 626A-626D is accessible from the back of the label. As is described in greater detail below, the respective ends of the first plurality of fasteners 626A-626D are suitable for attaching to respective ends of corresponding fasteners accessible at the back of the second label 621. According to an alternate embodiment, a different style fastener, for example, VELCRO is employed. According to these embodiments, the first plurality of fasteners 626A-626D are only accessible on the rear side of the first label 620.

Referring to FIG. 6C, the front side of the second label 621 includes a front surface 623, and a second plurality of fasteners 627A-627D. A logo 676 is located on the front surface of the second label 621. According to the illustrated embodiment, the second plurality of fasteners 627A-627D include through-fasteners that extend from the front side of the second label 621 to the rear side of the second label 621, for example, snaps. According to one embodiment, a through-fastener is located in each corner of the second label 621.

Referring to FIG. 6D, the rear side of the second label 621 includes a rear surface 625, and the second plurality of fasteners 627A-627D. According to the illustrated embodiment, the rear side of each of the second plurality of fasteners 627A-627D extends through second label 621 from the front to the back such that a rear side of each of the second plurality of fasteners 627A-627D is accessible from the back of the label. As is described in greater detail below, the respective ends of the second plurality of fasteners 627A-627D are suitable for attaching to respective ends of corresponding fasteners accessible on the back of the first label 620. According to an alternate embodiment, a different style fastener, for example, VELCRO is employed. According to these embodiments, the second plurality of fasteners 627A-627D are only accessible on the rear side of the second label 621.

In operation, the label system 600 is applied to sports netting by sandwiching the sports netting between the first label 620 and the second label 621. The label system 600 is assembled with the respective rear surfaces 624 and 625 facing one another, the labels 620, 621 are aligned with the netting such that the first plurality of fasteners 626A-626D and the second plurality of fasteners 627A-627D are located in respective openings within the net. The fasteners are pressed together to attach the first label 620 and the second label 621. The label system 600 is then securely and temporarily attached to the sports netting. This is accomplished without the use of tools. The label system 600 is also easily removed without the use of tools.

Referring to FIGS. 6E-6G, the label system 600 is illustrated when employed with different types of sports netting. FIG. 6E illustrates the label system 600 employed with a tennis net 603. FIG. 6F illustrates the label system 600 employed with a volleyball net 604. FIG. 6G illustrates the label system 600 employed with a lacrosse net 605.

Figure 7A:
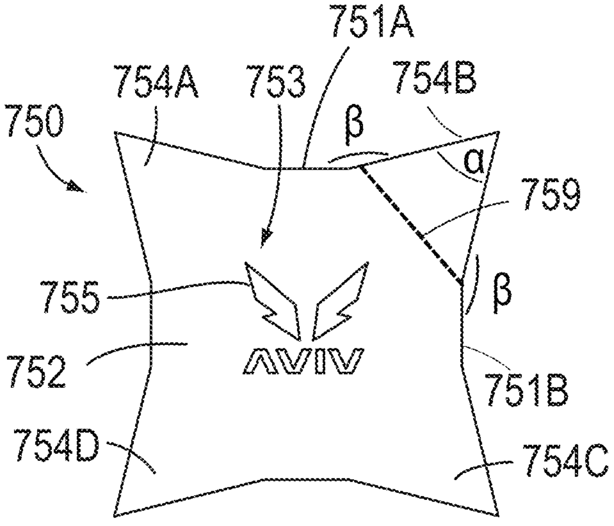
FIGS. 7A-7E illustrate a label in accordance with a seventh embodiment.

Referring now to FIGS. 7A-7E, a label 750 is illustrated in accordance with a thirteenth embodiment. FIG. 7A illustrates a front view of the label 750. The label 750 includes a body 752, a front surface 753 and a plurality of tabs 754A-754D. Each of the plurality of tabs 754A, 754B, 754C and 754D extend radially outward from a respective corner of the body 752 and include an angle α where the outer edges of the tab meet at a distal end of the tab. A single angle α illustrated in FIG. 7A is representative of the angle found at a distal end of each of the plurality of tabs 754A-754D. The label 750 includes an edge that defines an outside edge of the body 752 and of the tabs 754A-754D. An outer edge of the body extends along an outer edge of the label 750 including a first edge 751A that extends between the first tab 754A and the second tab 754B, and a second edge that extends between the second tab 754B and the third tab 754C. In operation, each of the tabs 754A-754D folds rearward along a respective fold line. A single fold line 759 illustrated in phantom is representative of the fold lines associated with each of the plurality of tabs 754A-754D. The fold line 759 extends between an attachment between an outer edge of the second tab 754B and the first edge 751A and an attachment between an outer edge of the second tab 754B and the second edge 751B. An angle of attachment where the edge of the respective tab meets the edge of the body forms an obtuse angle. For example, a first obtuse angle β is formed where the edge of the second tab 754B meets the first edge 751A. A second obtuse angle β is formed where the edge of the second tab 754B meets the second edge 751B. The pair of angles β illustrated in in FIG. 7A are representative of the angles found at each location where a tab attaches to the body 752.

As is described in further detail below, the geometry of construction of the label 750 provides a shape that is beneficial to maintaining a long life of the basketball net through a repeated application of a label in the same region of the netting. That is, to provide the label with a shape that allows the label to be securely attached to the net while avoiding contact between the adhesive and the basketball net.

According to the illustrated embodiment, a logo 755 is centrally located on the front surface 753. According to some embodiments, the label 750 is manufactured of a synthetic material including elastane, for example, Lycra or Spandex synthetic fiber.

Figure 7B:
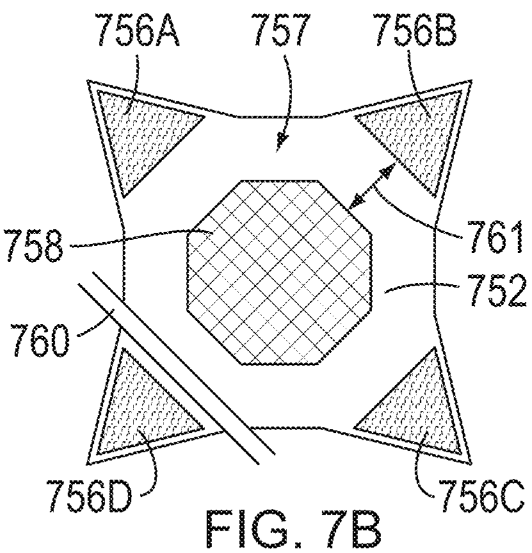

FIG. 7B illustrates a rear view of the label 750. In various embodiments, the rear side of the plurality of tabs 745A-754D include an adhesive. The rear side includes a rear surface 757 and a plurality of adhesive regions 756A-756D each located on the rear surface of one of the plurality of tabs 745A-754D, respectively. The label 750 also includes a central adhesive region 758 located on the rear surface 757. An adhesive-free region 761 exists between each of the adhesive regions 756A-756D, respectively, and the central adhesive region 758. In some embodiments, the surface area of the adhesive free region 761 is controlled by selecting a desired radius of the central adhesive region 758 and a radial length of each of the plurality of adhesive regions 756A-756D. A proper selection of these dimension provides sufficient space to locate a string 760 included in a basketball net. In particular, the dimensions are established to allow the string 760 to be securely enclosed when the tabs 745A-745D are folded rearward while avoiding contact between the string 760 and either the central adhesive region 758 or any of the plurality of adhesive regions 756A-756D. Applicant finds that this prevents damage to the string 760 that would otherwise occur.

Figure 7C:
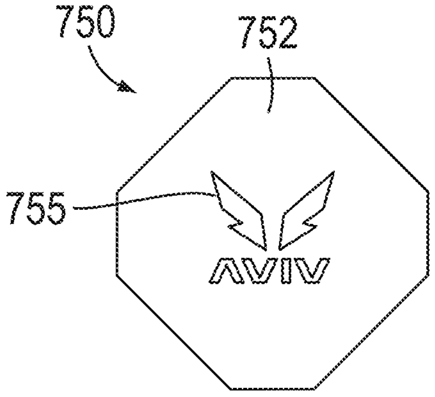

FIG. 7C illustrates a front view of the label 750 in a configuration where the plurality of tabs 754A-754D are folded rearward to place each of the plurality of tabs 754A-754D, respectively, in contact with the rear of the label 750 as is illustrated and described in greater detail below with reference to FIG. 7E. According to this embodiment, the rearward fold allows each of the plurality of adhesive regions 756A-756D to be placed in contact with the central adhesive region 758. In various embodiments, the bond formed between the each of the respective plurality of adhesive regions 756A-756D and the central adhesive region 758 is secure but temporary. According to various embodiments, VELCRO hook and loop style fastening material is employed for each of the plurality of adhesive regions 756A-756D and the central adhesive region 758. In various embodiments, other forms of adhesive can be employed if they will stay securely attached when subject to typical wear and tear that a basketball net is subject to while also providing a releasable attachment. In various embodiments, the adhesive strength and manner of fastening allow the label to be removed from the net by hand without the use of tools. These alternative fastening means can include snaps, ties, other mechanical fastening means, or glue that provides a releasable bond.

Figure 7D:
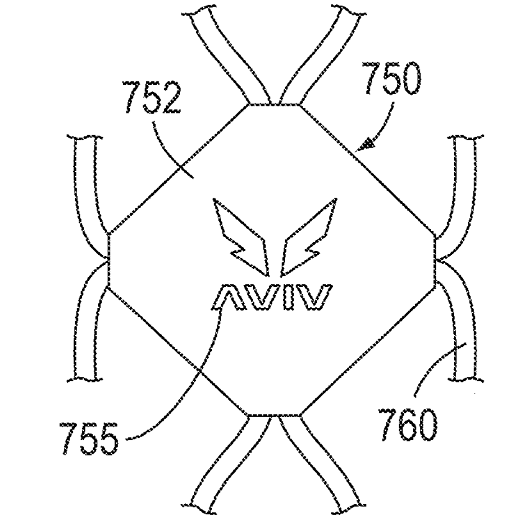

FIG. 7D illustrates a front view of the label 750 with the label secured to the strings 760 included in a basketball net. When attached as illustrated the front surface 753 of the body 752 is unobstructed when viewed from the net. This clearly displays the logo 755 when attached to the net. Further, the manner of attachment provides the label with a secure attachment at each of four corners.

Figure 7E:
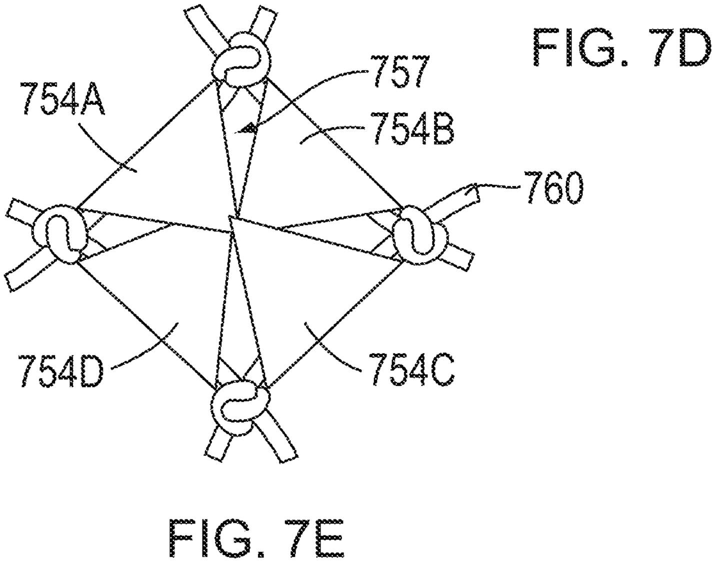

As illustrated in FIG. 7E, when in operation, each of the plurality of tabs 754A-754D is folded rearward toward the rear surface 757 to wrap around the string 760. Each of the plurality of tabs 754A-754D is pressed into engagement with the body 752. This presses each of the respective adhesive regions included in the plurality of adhesive regions 756A-756D into engagement with the central adhesive region 758. Thus, securely trapping the string within a corner of the label 750. Applicant finds that adhesive such as Velcro fasteners can cause fraying or other damage to the strings 760 when they are repeatedly placed in contact with one another. Both the shape and the location of the adhesive allow the label 750 to be employed to fasten the label securely and temporarily 750 to the basketball net without contact between the adhesive regions located on the back of the label 750 and the strings 760.

Applicant finds that a combination of the shape of the label 750 and size and shape of each of: the body 752, the plurality of tabs 754A-754D, the plurality of adhesive regions 756A-756D, and the central adhesive region 758, respectively, provide the benefits described here. For example, referring again to FIG. 7A, a shape of each of the plurality of tabs 754A-754D is defined in part by the angle α located at the distal end of each tab. Selection of an acute angle (those less than 90 degrees) at the distal end of each of the plurality of tabs 754A-754D brings the distal end to a relatively narrow point when compared with obtuse angles (those between 90 and 180 degrees). The selection of these angles α as acute angles restricts the width of the respective tabs. Similarly, a width of the base of each of the plurality of tabs 754A-754D is defined in part by the pair of angles β found at each location where a tab attaches to the body 752. This selection acts to restrict the width of the respective tabs. According to the illustrated embodiment, the combined selection of the angles α as acute angles and the pairs of angles β as obtuse angles define the plurality of tabs 754A-754D having a shape that is configured to prevent contact between and the string 760 included in the sports netting and each of the adhesive regions 756A-756D located on the rear surface of the tabs when the label 750 is attached to the sports netting as illustrated in FIGS. 7D and 7E.

Figure 8A:
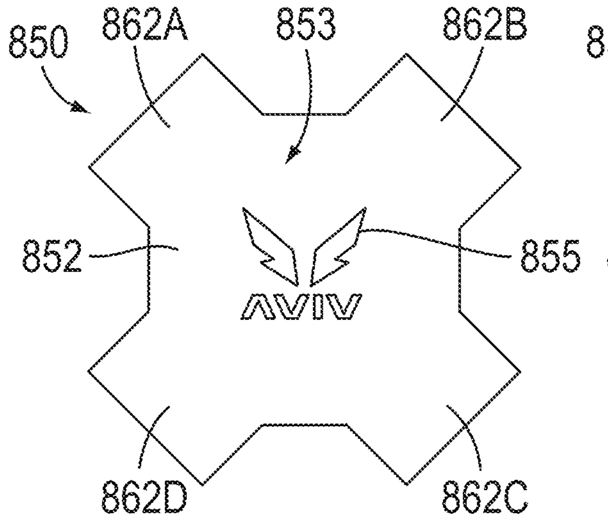
FIGS. 8A-8D illustrate a label in accordance with an eighth embodiment.
Figure 8B:
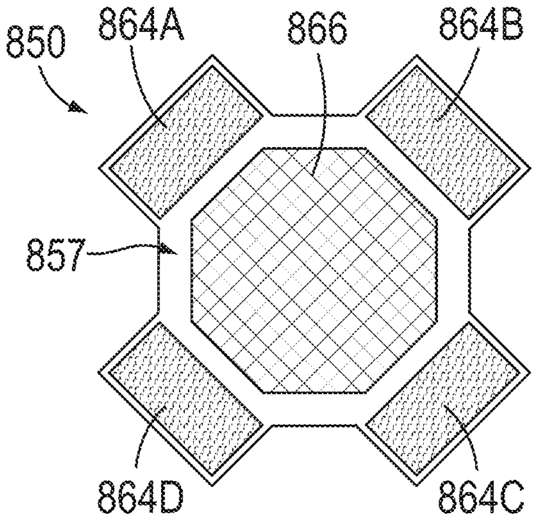

Referring now to FIGS. 8A-8D, a label is illustrated in accordance with an eighth embodiment. FIG. 8A illustrates a front view of the label 850. The label 850 includes a body 852, a front surface 853 and a plurality of tabs 862A-862D. Each of the plurality of tabs 862A, 862B, 862C and 862D extend radially outward from a respective corner of the body 852. A logo 855 is centrally located on the front surface 853. FIG. 8B illustrates a rear view of the label 850 including a rear surface 857. As viewed from the rear, the label 850 includes a plurality of adhesive regions 864A-864D each adhesive region located on the rear surface of one of the plurality of tabs 862A-862D, respectively. The label 850 also includes a central adhesive region 866 located on the rear surface 857.

Figure 8C:
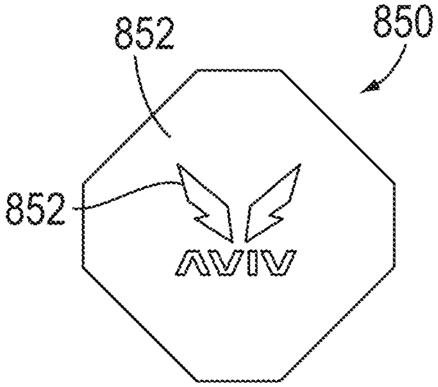

FIG. 8C illustrates a front view of the label 850 in a configuration where the plurality of tabs 862A-862D are folded backwards to place each of the plurality of tabs 862A-862D, respectively, in contact with the rear side of the label 850. According to this embodiment, the rearward fold allows each of the plurality of adhesive regions 864A-864D to be placed in contact with the central adhesive region 866. In various embodiments, the bond formed between the each of the respective plurality of adhesive regions 864A-864D and the central adhesive region 866 is secure but temporary. According to various embodiments, VELCRO hook and loop style fastening material is employed for each of the plurality of adhesive regions 864A-864D and the central adhesive region 866. In various embodiments, other forms of adhesive or other forms of fastening can be employed.

Figure 8D:
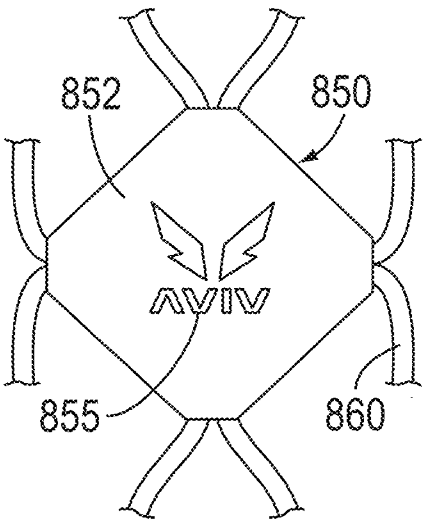

FIG. 8D illustrates a front view of the label 850 with the label secured to the strings 860 included in a basketball net. Here, the strings 860 are trapped within the fold formed when a tab 862A-862D is folded backward and pressed into engagement with the rear of the body 852. Further, the configuration illustrated in FIGS. 8A-8D allows four separate sections of string 860 to be secured within the folds of the label 850. When attached as illustrated the front surface 853 of the body 852 is unobstructed when viewed from the front of the net. Here too, the logo 855 is clearly displayed with the label attached to the net. Further, the manner of attachment provides the label with a secure attachment at each of four corners.

Figure 9A:
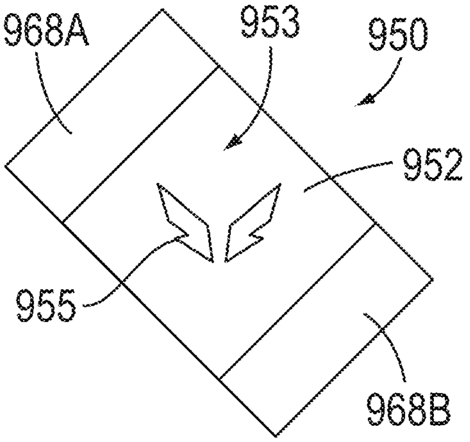
FIGS. 9A-9D illustrate a label in accordance with a ninth embodiment.
Figure 9B:
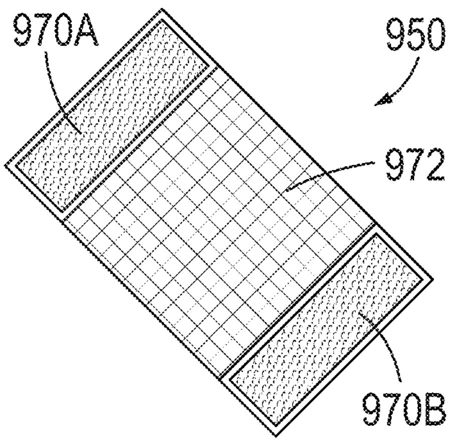

Referring now to FIGS. 9A-9D, a label is illustrated in accordance with a third embodiment. FIG. 9A illustrates a front view of the label 950. The label 950 includes a body 952, a front surface 953, a first end 968A and a second end 968B. The two ends 968A, 968B extend from opposite ends of the body 953. A logo 955 is centrally located on the front surface 953. FIG. 9B illustrates a rear view of the label 950. The rear side of the first end 968A and the rear side of the second end 968B each include an adhesive. As viewed from the rear, the label 950 includes a first adhesive region 970A located on the rear of the first end 968A and a second adhesive region 970B located on the rear of the second end 968B. The label 950 also includes a central adhesive region 972 located on the rear side of the label 950.

Figure 9C:
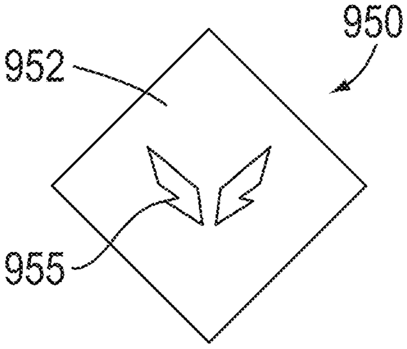

FIG. 9C illustrates a front view of the label 950 in a configuration where the first end 968A and the second end 968B are folded backwards to place each of the first adhesive region 970A and the second adhesive region 970B, respectively, in contact with the central adhesive region 972 located on the rear side of the label 950. The ends 968A, 968B are pressed into engagement with the rear side of the body 950 to securely attach the adhesive regions 970A, 970B and the central adhesive region 972. In various embodiments, the bond that is formed between each of the adhesive regions 970A, 970B and the central adhesive region 972 is secure but temporary. According to various embodiments, VELCRO hook and loop style fastening material is employed for the adhesive regions 970A, 970B and 972, respectively. In various embodiments, other forms of adhesive or other forms of fastening can be employed.

Figure 9D:
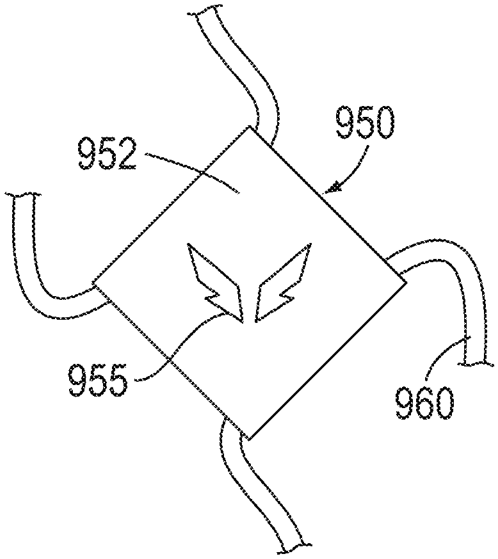

FIG. 9D illustrates a front view of the label 950 with the label secured to the strings 960 included in a basketball net. Here, the strings 960 are trapped within the fold formed when an end 968A, 968B is folded backward and pressed into engagement with the rear of the body 952. According to this embodiment, two separate sections of string 960 are secured within the folds of the label 950. When attached as illustrated the front surface 953 of the body 952 is unobstructed when viewed from the front of the net. Here too, the logo 955 is clearly displayed with the label attached to the net.

Figure 10A:
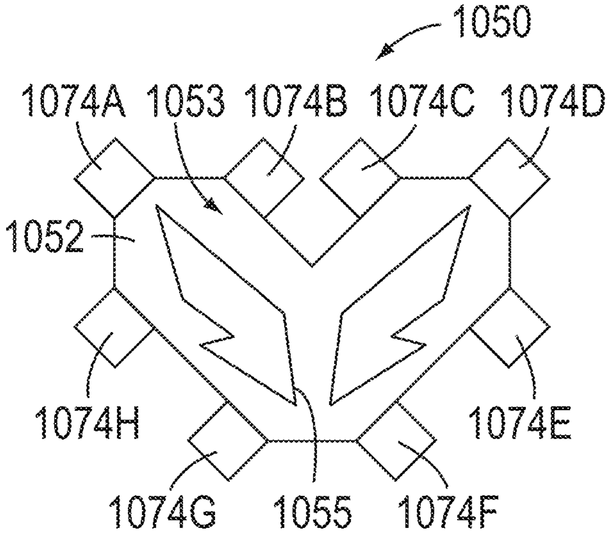
FIGS. 10A-10D illustrate a label in accordance with a tenth embodiment.
Figure 10B:
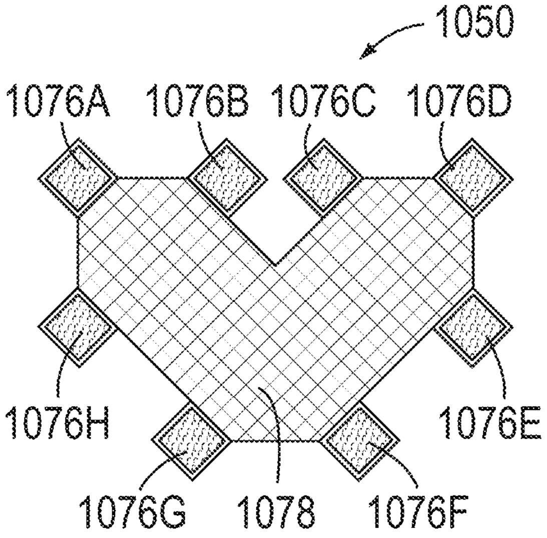

Referring now to FIGS. 10A-10D, a label is illustrated in accordance with a tenth embodiment. FIG. 10A illustrates a front view of the label 1050. The label 1050 includes a body 1052, a front surface 1053 and a plurality of tabs 1074A-1074H. Each of the plurality of tabs 1074A-1074H extend outward from the body 1052. A logo 1055 is centrally located on the front surface 1053. FIG. 10B illustrates a rear view of the label 1050. The rear side of the plurality of tabs 1074A-1074H include an adhesive. As viewed from the rear, the label 1050 includes a plurality of adhesive regions 1076A-1076H each adhesive region located on a rear side of one of the plurality of tabs 1074A-1074H, respectively. A central adhesive region 1078 is located on the rear side of the body 1052.

Figure 10C:
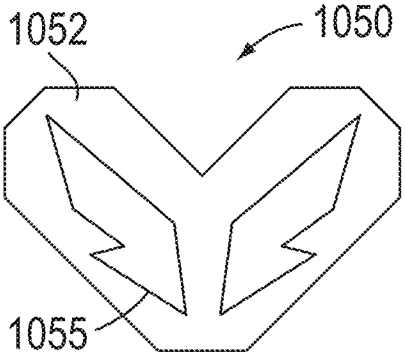

FIG. 10C illustrates a front view of the label 1050 in a configuration where the plurality of tabs 1074A-1074H are folded backwards to place each of the plurality of tabs 1074A-1074H, respectively, in contact with the rear side of the label 1050. According to this embodiment, the rearward fold allows each of the plurality of adhesive regions 1074A-1074H to be pressed into contact with the central adhesive region 1078, at different locations. In various embodiments, the bond formed between the each of the respective plurality of adhesive regions 1076A-1076H and the central adhesive region 1078 is secure but temporary. According to various embodiments, VELCRO hook and loop style fastening material is employed for each of the plurality of adhesive regions 1076A-1076H and the central adhesive region 1078. In various embodiments, other forms of adhesive or other forms of fastening can be employed.

Figure 10D:
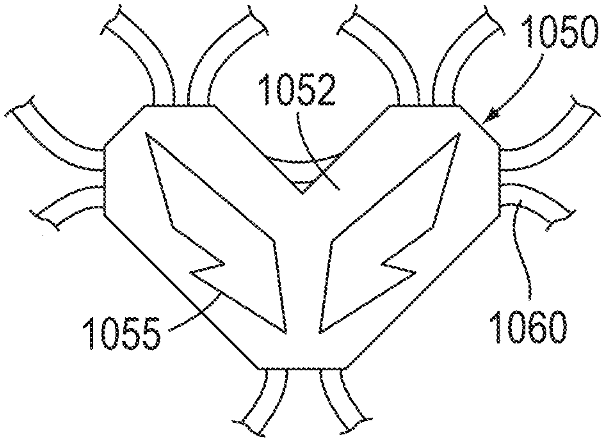

FIG. 10D illustrates a front view of the label 1050 with the label secured to the strings 1060 included in a basketball net. Here, the strings 1060 are trapped within the fold formed when a tab 1074A-1074H is folded backward and pressed into engagement with the rear of the body 1052. Further, the configuration illustrated in FIGS. 10A-10D allows eight separate sections of string 1060 to be secured within the folds of the label 1050. When attached as illustrated the front surface 1053 of the body 1052 is unobstructed when viewed from the front of the net. Here too, the logo 1055 is clearly displayed with the label attached to the net.

Figure 11A:
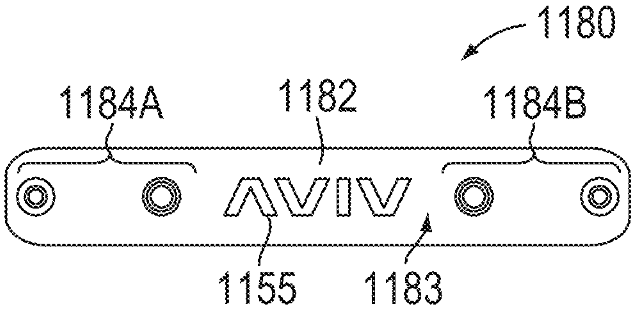
FIGS. 11A-11D illustrate a label in accordance with an eleventh embodiment.
Figure 11B:
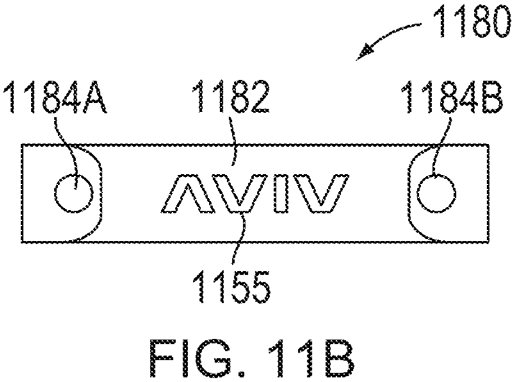

Referring now to FIGS. 11A-11D, a label 1180 is illustrated in accordance with an eleventh embodiment. FIG. 11A illustrates a front view of the label 1180. The label 1180 includes a body 1182, a front surface 1183, a first snap 1184A located at a first end of the body 1182 and a second snap 1184B located at a second end of the body 1182 opposite the first end. FIG. 11A illustrates the first snap 1184A and the second snap 1184B in an open position. Each of the first snap 1184A and the second snap 1184B include a respective socket and stud visible in FIG. 11A. A logo 1155 is centrally located on the front surface 1183. FIG. 11B illustrates a front view of the label 1180 with the both the first snap 1184A and the second snap 1184B fastened in the closed position. A respective snap cap included in each of the first snap 1184A and the second snap 1184B is visible in FIG. 11B.

Figure 11C:
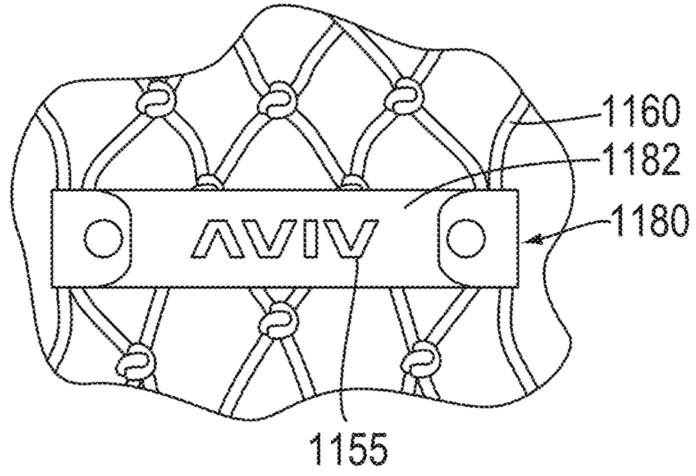
Figure 11D:
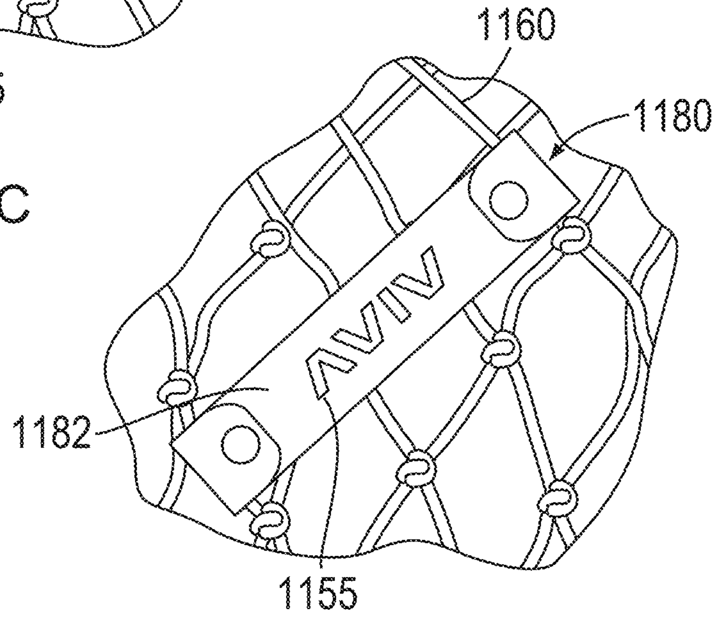

FIG. 11C illustrates the label 1180 attached to strings 1160 included in a basketball net. According to the illustrated embodiment, the label 1180 is securely attached to the basketball net by securing the first end of the label 1180 to one or more strings 1160 using the first snap 1184C and securing the second end of the label 1180 to one or more strings 1160 using the second snap 1184B. In operation, one or more strings are located between the socket and the stud of the snaps 1184A, 1184B, respectively. Each end of the label is folded on itself to engage the two elements of the snap and allow the secure fastening of the snap with a string captured within the label 1180 at each end. The shape and form factor of the label 1180 allows it to be employed in various orientations to display the logo. For example, FIG. 11C illustrates a first orientation in which the label is secured in a horizontal orientation. FIG. 11D illustrates a second orientation in which the label 1180 is secured in an angled orientation across the face of the net.

Figure 12A:
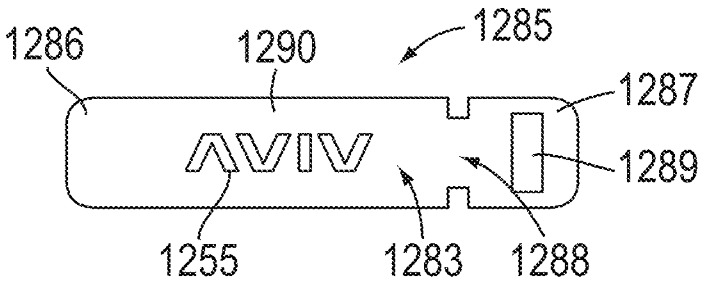
FIGS. 12A-12D illustrate a label in accordance with a twelfth embodiment.
Figure 12B:
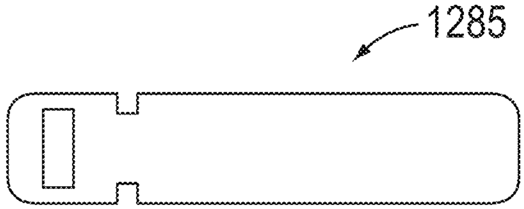

Referring now to FIGS. 12A-12D, a label 1285 is illustrated in accordance with a sixth embodiment. FIG. 12A illustrates a front view of the label 1285. The label 1285 includes a body 1290, a front surface 1283, a first end of the body 1286, a second end of the body 1287, a notched region 1288 and an opening 1289 that is defined in the second end of the body 1287. FIG. 12B illustrates a rear view of the label 1285 and a rear surface of the label.

Figure 12C:
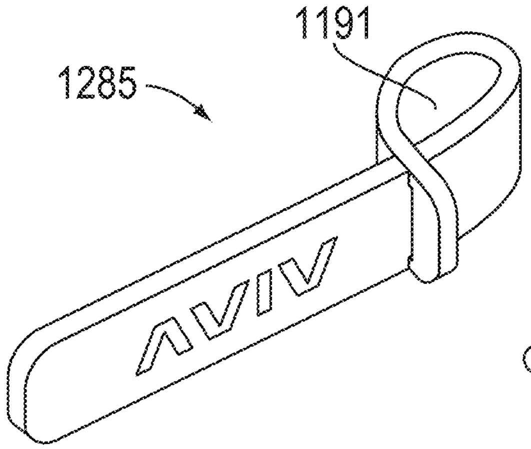

FIG. 12C illustrates the label 1285 in a fastened position. To fasten the label, the first end 1286 is folded backwards and inserted in the opening 1289. The first end is drawn through the opening 1289 wrapping on itself until the notches that define the notched region 1288 align with the walls that define the opening 1289. Here, the engagement between the notches and the walls of the opening provides a catch that fixes the label 1285 in a loop 1291. In various embodiments, a distance separating the notched region 1288 from a distal portion of the second end of the body 1287 establish an inner diameter of the loop 1291 with the label in the "latched" state illustrated in FIG. 12C.

Figure 12D:
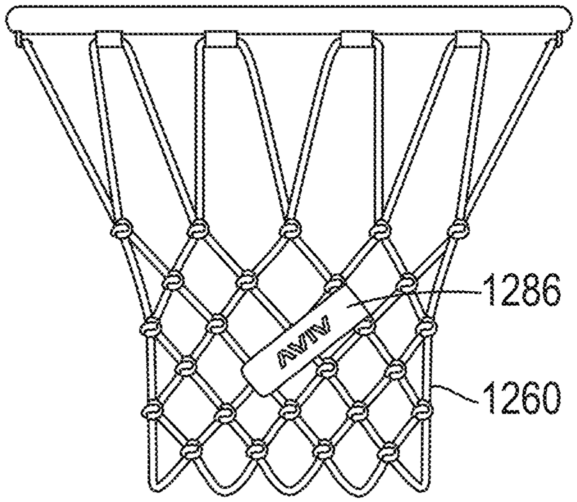

As illustrated in FIG. 12D, the label 1285 is attached to a string 1260 included in the basketball net. This is accomplished by locating the string adjacent the rear surface of the label 1285 when the first end 1286 is folded rearward and drawn through the opening 1289. The label 1285 is securely attached to the string 1260 when the label 1285 is placed in the latched position illustrated in FIG. 12C with the string 1260 enclosed within the opening 1291.

Figure 13A:
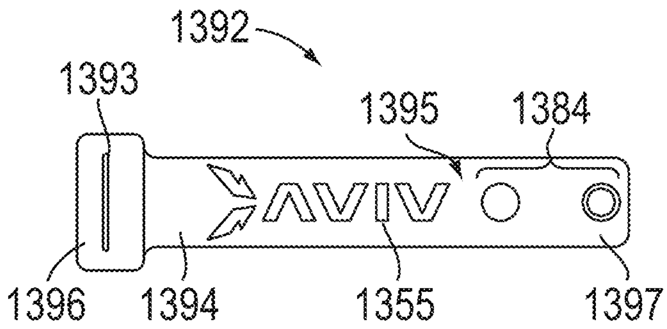
FIGS. 13A-13C illustrate a label in accordance with a thirteenth embodiment.
Figure 13B:
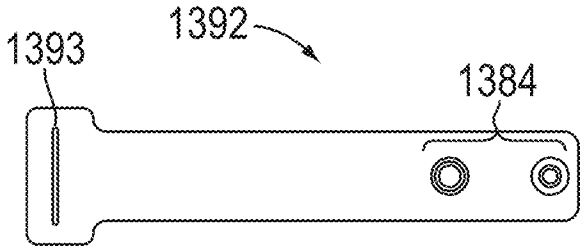
Figure 13C:
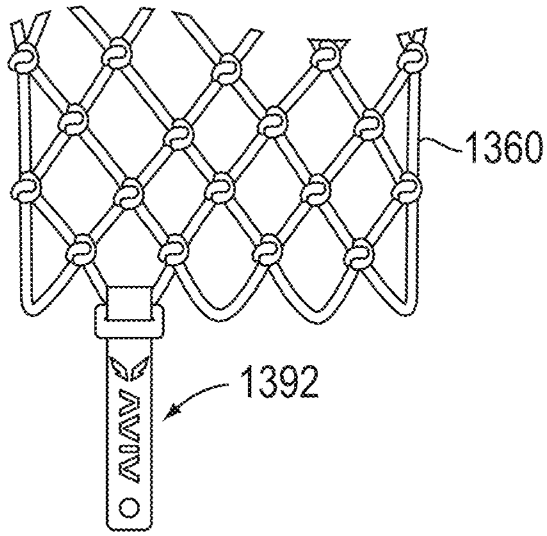

Referring now to FIGS. 13A-13C, a label 1392 is illustrated in accordance with a thirteenth embodiment. FIG. 13A illustrates a front view of the label 1392. The label 1392 includes a body 1394, a front surface 1395, a slit 1393 located at a first end 1396 of the body and a snap 1384 located at a second end 1397 of the body. FIG. 13B illustrates a rear view of the label 1392 and a rear surface of the label. The configuration of the label 1392 allows the label to be attached to a basketball net in one of two hanging configurations. FIG. 13C illustrates a first configuration in which a string 1360 is trapped within a loop formed when the second end 1397 of the label is inserted within the slit 1393 with the string 1360 proximate a rear side of the label 1392. The resulting attachment is illustrated in FIG. 13C. In an alternative form of attachment, the snap 1384 is employed as described with reference to the eleventh embodiment above.

Figure 14A:
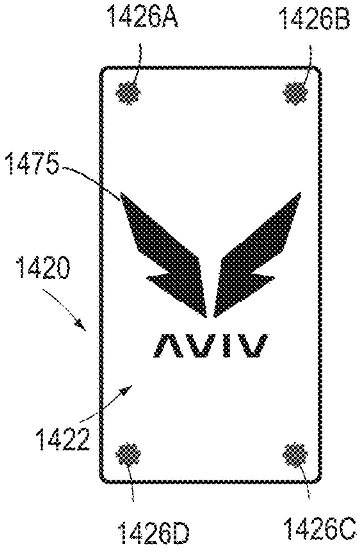
FIGS. 14A-14E illustrate a label in accordance with a fourteenth embodiment.
Figure 14B:
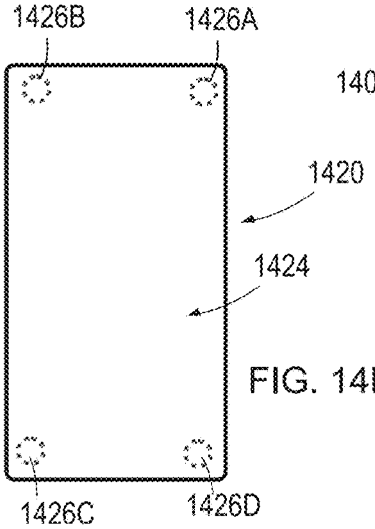
Figure 14E:
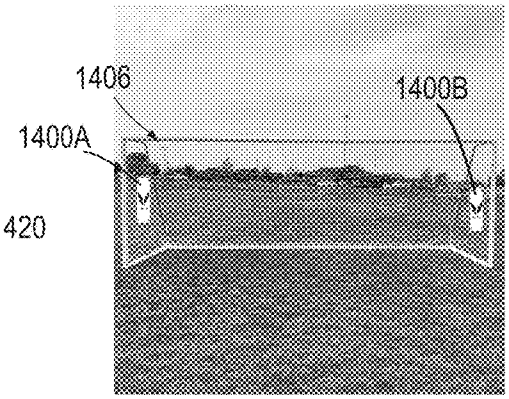
Figure 14C:
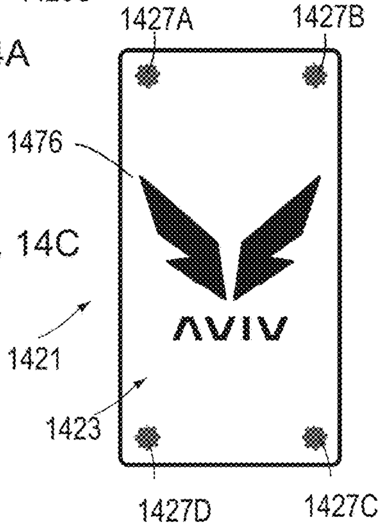
Figure 14D:
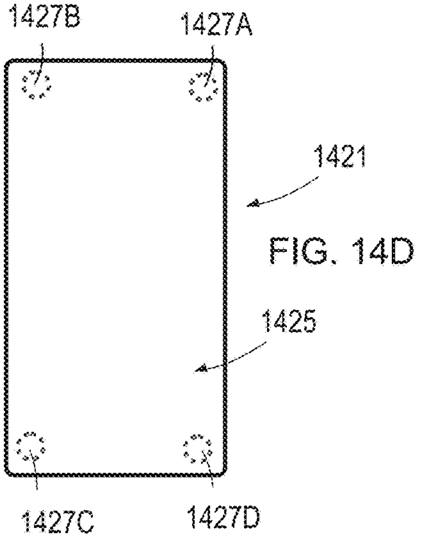

Referring now to FIGS. 14A-14E a label system 1400 is illustrated in accordance with a fifth embodiment. In general, the label system 1400 is comparable to the label system 600 illustrated and described with reference to FIGS. 6A-6G but having larger dimensions. The label system 1400 includes a first label 1420 and a second label 1421. In general, the label system 1400 includes two labels that are secured to a sports netting and attached to one another back-to-back. When attached to a net these embodiments provide a label system 1400 including a two sided label assembled by hand when it is secured to the net. The overall label system 1400 provides two exposed surfaces each suitable for the display of logos, text, graphics or other indicia. According to the illustrated embodiment, the label system 1400 provides a two sided label having an overall rectangular shape. FIGS. 14A and 14B illustrate a front side of the first label 1420 and a rear side of the first label 1420, respectively. FIGS. 14C and 14D illustrate a front side of the second label 1421 and a rear side of the second label 1421, respectively.

Referring to FIG. 14A, the front side of the first label 1420 includes a front surface 1422, and a first plurality of fasteners 1426A-1426D. A logo 1475 is located on the front surface of the first label 1420. According to the illustrated embodiment, the first plurality of fasteners 1426A-1426D include through-fasteners that extend from the front side of the first label 1420 to the rear side of the first label 1420, for example, snaps. According to one embodiment, a through-fastener is located in each corner of the first label 1420.

Referring to FIG. 14B, the rear side of the first label 1420 includes a rear surface 1424, and the first plurality of fasteners 1426A-1426D. According to the illustrated embodiment, the rear side of each of the first plurality of fasteners 1426A-1426D extends through first label 1420 from the front to the back such that a rear side of each of the first plurality of fasteners 1426A-1426D is accessible from the back of the label. As is described in greater detail below, the respective ends of the first plurality of fasteners 1426A-1426D are suitable for attaching to respective ends of corresponding fasteners accessible at the back of the second label 1421, for example, snaps. According to an alternate embodiment, a different style fastener, for example, VELCRO is employed. According to these embodiments, the first plurality of fasteners 1426A-1426D are only accessible on the rear side of the first label 1420.

Referring to FIG. 14C, the front side of the second label 1421 includes a front surface 1423, and a second plurality of fasteners 1427A-1427D. A logo 1476 is located on the front surface of the second label 1421. According to the illustrated embodiment, the second plurality of fasteners 1427A-1427D include through-fasteners that extend from the front side of the second label 1421 to the rear side of the second label 1421, for example, snaps. According to one embodiment, a through-fastener is located in each corner of the second label 1421.

Referring to FIG. 14D, the rear side of the second label 1421 includes a rear surface 1425, and the second plurality of fasteners 1427A-1427D. According to the illustrated embodiment, the rear side of each of the second plurality of fasteners 1427A-1427D extends through second label 1421 from the front to the back such that a rear side of each of the second plurality of fasteners 1427A-1427D is accessible from the back of the label. As is described in greater detail below, the respective ends of the second plurality of fasteners 1427A-1427D are suitable for attaching to respective ends of corresponding fasteners accessible on the back of the first label 1420. According to an alternate embodiment, a different style fastener, for example, VELCRO is employed. According to these embodiments, the second plurality of fasteners 1427A-1427D are only accessible on the rear side of the second label 1421.

In operation, the label system 1400 is applied to sports netting by sandwiching the sports netting between the first label 1420 and the second label 1421. The label system 1400 is assembled with the respective rear surfaces 1424 and 1425 facing one another, the labels 1420, 1421 are aligned with the netting such that the first plurality of fasteners 1426A-1426D and the second plurality of fasteners 1427A-1427D are located in respective openings within the net. The fasteners are pressed together to attach the first label 1420 and the second label 1421. The label system 1400 is then securely and temporarily attached to the sports netting. This is accomplished without the use of tools. The label system 1400 is also easily removed without the use of tools.

Referring to FIG. 14E, the label system 1400 is illustrated when employed with a soccer net 1406 included in the goal. For example, the first label 1420 is located on the front side at the rear of the net with the logo 1475 facing forward toward the center circle of the field. The second label 1421 is located on the rear side of the net directly opposite and adjacent to the first label 1420. With the two labels 1420, 1421 properly aligned, the first plurality of fasteners 1426A-1426D and the second plurality of fasteners 1427A-1427D are aligned at the back of the respective labels. Further, the two labels are also aligned such that the first plurality of fasteners 1426A-1426D and the second plurality of fasteners 1427A-1427D are aligned at openings within the soccer net 1406. The fasteners are pressed together to secure the labels 1420, 1421 to one another. With the label system 1400 attached, the logo 1475 faces toward the playing field where it is visible to anyone viewing the front of the goal. The logo 1476 faces toward the goal line where it is visible to anyone viewing the rear of the goal.

Figure 15C:
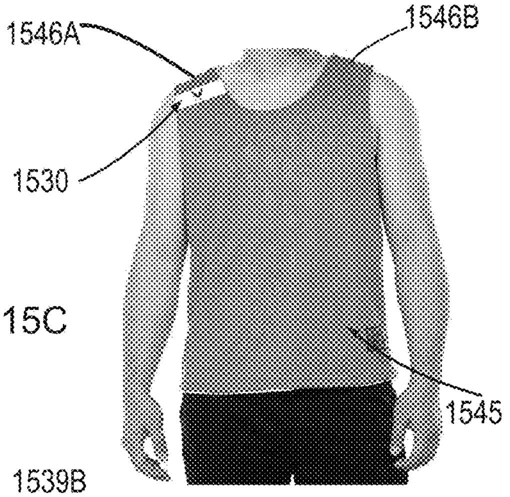
FIGS. 15A-15C illustrate a badge in accordance with one embodiment.
Figure 15A:
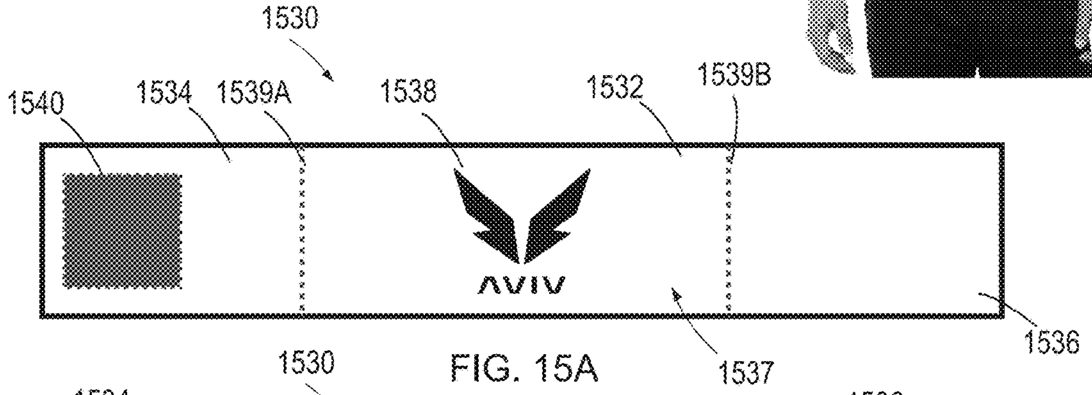
Figure 15B:
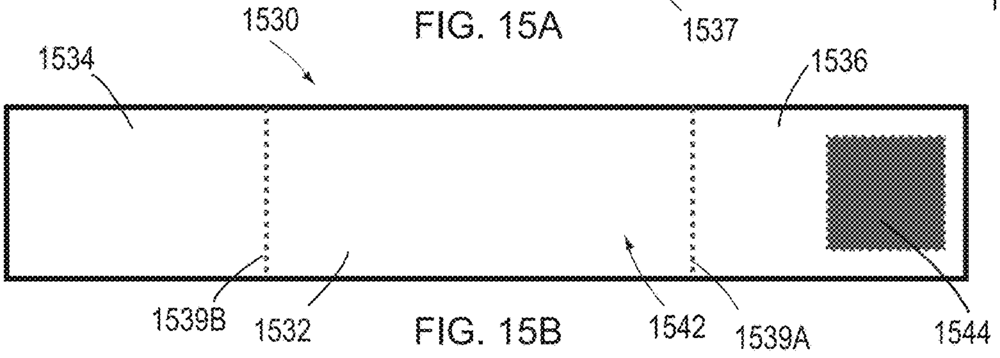

Referring now to FIGS. 15A-15C, a badge 1530 is illustrated in accordance with various embodiments. The badge 1530 provides another form of removable label. Here, the badge 1530 is sized and configured for an attachment to a shirt 1545 to allow a user to prominently display a logo, brand or other indicia. In various embodiments, the badge 1530 is securely fastened by hand to an article of clothing using a temporary form of adhesion that is also easily released by hand to remove the badge from clothing when desired by the user. This permits the repeated use of the badge on the same or different articles of clothing.

Referring to FIG. 15A, a front side of the badge 1530 is illustrated in accordance with one embodiment. The badge includes a central region 1532, a first end 1534 and a second end 1536. The badge 1530 includes a front surface 1537. A logo 1538 is centrally located in the central region 1532 in the illustrated embodiment. A first fold line 1539A is located where the central region 1532 and the first end 1534 meet. A second fold line 1539B is located where the central region 1532 and the second end 1536 meet. According to the illustrated embodiment, the first end includes a first adhesive region 1540 located on the front surface 1537.

Referring to FIG. 15B, a rear side of the badge 1530 is illustrated in accordance with one embodiment. The badge includes a central region 1532, a first end 1534 and a second end 1536. The rear side of the badge 1530 includes a rear surface 1542. The first fold line 1539A and the second fold line 1539B are illustrated from the rear side in FIG. 15B. According to the illustrated embodiment, the second end includes a second adhesive region 1544 located on the rear surface 1542. In one embodiment, each of the first adhesive region 1540 and the second adhesive region 1544 are a VELCRO hook and loop style fastening material. According to other embodiments, different fasteners can be used that securely and temporarily attach to one another, for example, a snap fastener that secures a first snap element located in place of the first adhesive region 1540 and a corresponding second snap element located in place of the second adhesive region 1544.

Referring to FIG. 15C, the badge 1530 is illustrated when secured to a shirt 1545. According to the illustrated embodiment the shirt 1545 is a tank top that includes a first shoulder strap 1546A and a second shoulder strap 1546B. In use, the rear surface 1542 of the label 1530 is placed against the outer surface of the first shoulder strap 1546A. The first end 1534 is folded backwards along the fold line 1539A. The second end 1536 is folded backwards along the second fold line 1539B. When each of the folds is completed for 180 degrees, the front surface 1537 of the first end 1534 is placed against the rear surface 1542 of the second end 1536. This places the first adhesive region 1540 in contact with the second adhesive region 1544. The badge 1530 is secured to the shirt 1545 by pressing the first end 1534 against the second 1536 to secure the two adhesive regions 1540, 1544 to one another on the rear side of the first shoulder strap 1546A. This orients the first surface 1537 to prominently display the logo 1538 or other indicia. In further embodiments, multiple badges can be worn by the user on their shirt 1545. For example, a first badge 1530 can be worn on the first shoulder strap 1546A and a second badge 1530 can be worn on the second shoulder strap 1546B. In another example, multiple badges 1530 can be worn on a single shoulder strap.

Figure 16A:
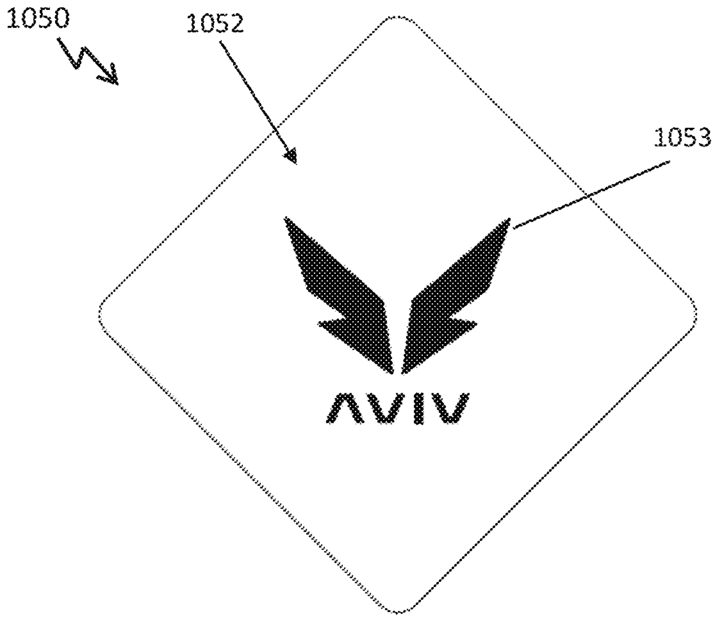
FIGS. 16A and 16B illustrate a net signage system in accordance with one embodiment.
Figure 16B:
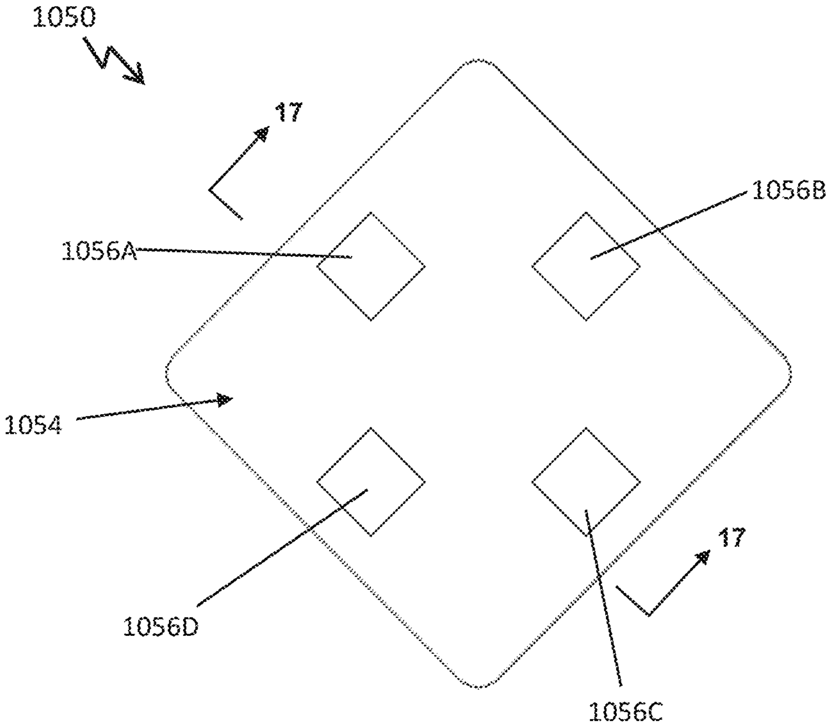

Referring now to FIGS. 16A and 16B, a signage system 1050 for sports netting is illustrated in accordance with another embodiment. According to this embodiment, the signage system includes a body having a front surface 1052 and a back surface 1054. Indicia 1053 such as text, graphics and or a combination of text and graphics is displayed on the front surface 1052. A plurality of fasteners 1056A, 1056B, 1056C and 1056D are positioned at different locations on the rear surface 1054. In general, the signage system 1050 is attached to a sports net with the fasteners 1056 for a display of the indicia such as a display of logos, designs or other messaging.

Figure 17:
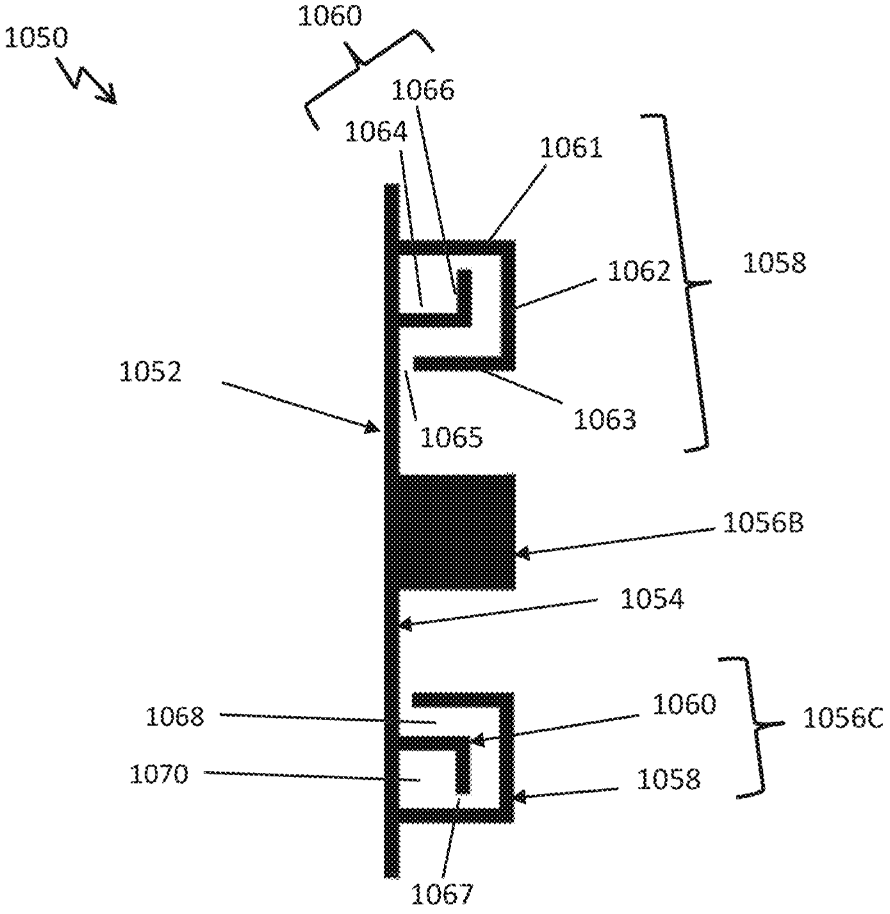
FIG. 17 illustrates a cross-sectional view of the net signage system illustrated in FIGS. 16A and 16B.

FIG. 17 illustrates a cross-sectional view of the signage system 1050 to illustrate details included in the plurality of fasteners 1056A-1056D in accordance with some embodiments. According to this embodiment, each fastener includes an outer arm 1058 and an inner arm 1060. The outer arm 1058 includes a post 1061, a first extension 1062 and a second extension 1063. The post 1061 is attached at right angles (or perpendicular) to the rear surface 1054. The portion of the post 1061 that is attached to the rear surface 1054 provides a proximate end of the outer arm 1058. The first extension 1062 is attached at right angles to the post 1061. This places the first extension 1062 parallel to the rear surface 1054. The second extension 1063 is attached at right angles to the first extension 1062. This places the second extension 1063 perpendicular to the rear surface 1054 and parallel to the post 1061 according to the illustrated embodiment. A free end of the second extension 1063 provides a distal end of the outer arm 1058. A gap 1065 separates the distal end of the outer arm 1058 from the rear surface 1054. According to some embodiments, the gap 1065 is sized to provide a separation distance between the rear surface 1054 and the distal end that is less than the outside diameter of the net cord with which the signage system 1050 is employed.

According to the illustrated embodiment, the inner arm 1060 includes a post 1064 and an extension 1066. The post 1064 is attached at right angles (or perpendicular) to the rear surface 1054. The portion of the post 1064 that is attached to the rear surface 1054 provides a proximate end of the inner arm 1060. The extension 1066 is attached at right angles to the post 1064. This places the extension 1066 parallel to the rear surface 1054. A free end of the extension 1066 provides a distal end of the inner arm 1060. A gap 1067 separates the distal end of the inner arm 1060 from the rear surface 1054. According to some embodiments, the gap 1067 is sized to provide a separation distance between the post 1061 of the outer arm 1058 and the distal end of inner arm 1060 that is less than the outside diameter of the net cord with which the signage system 1050 is employed.

According to the illustrated embodiment, the outer arm 1058 includes an exterior surface that is visible from the rear side of the signage system 1050 and an interior surface that faces toward the inner arm. The inner arm 1060 has an exterior surface that faces the interior surface of the outer arm 1058 and an interior surface with a portion that faces the rear surface 1054. According to the illustrated embodiment, each of the respective surfaces described here are planar surfaces. However, other surface shapes are possible, for example, where the arms 1058, 1060 have regions that have different shapes (for example, arcuate rather than straight).

The outer arm 1058 and the inner arm 1060 define a passageway 1068 located in the region between the two arms. A channel 1070 is defined in a region between the inner arm 1060 and the rear surface 1054. In the illustrated embodiment, a wall of the channel 1070 is formed by the second extension 1063 included in the outer arm 1058.

According to various embodiments, each of the outer arm 1058 and the inner arm 1060 are resilient members that can temporarily deform and/or flex with a spring-like return to the static position illustrated in FIG. 17. In overall operation, the fastener 1056 receives a net cord in an entrance to the passageway 1068 provided by the gap 1065. In more detail, the net cord is received by a fastener 1056 by sliding the net cord along the rear surface 1054 in the direction of the gap 1065. As a result of the deformable nature of the outer arm 1058, the pressure applied with the cord pressed against the exterior surface at the distal end flexes the outer arm 1058 inward toward the passageway 1068. As the distal end deflects, the width of the gap 1065 increases enough to allow the cord to move through the gap 1065 and into the passageway 1068. To reach the channel 1070, the cord is slid through the passageway 1068 until it reaches the gap 1067. As a result of the deformable nature of the inner arm 1060, the pressure applied with the cord pressed against the exterior surface at the distal end flexes the inner arm 1058 inward toward the channel 1070. As the distal end deflects, the width of the gap 1067 increases enough to allow the cord to move through the gap 1067 and into the channel 1070.

The signage system 1050 is secured to a sports net by securing a different net cord (or a different portion of the same net cord) within each of the plurality fasteners 1056A-1056D, as described above. For example, most conventional sports netting includes net-openings having an overall diamond or parallelogram shape (for example, a square or a rectangular). When used in these applications, the signage system 1050 can have each of the fasteners secured to a cord located on a different side of the net-opening, respectively.

Figure 18:
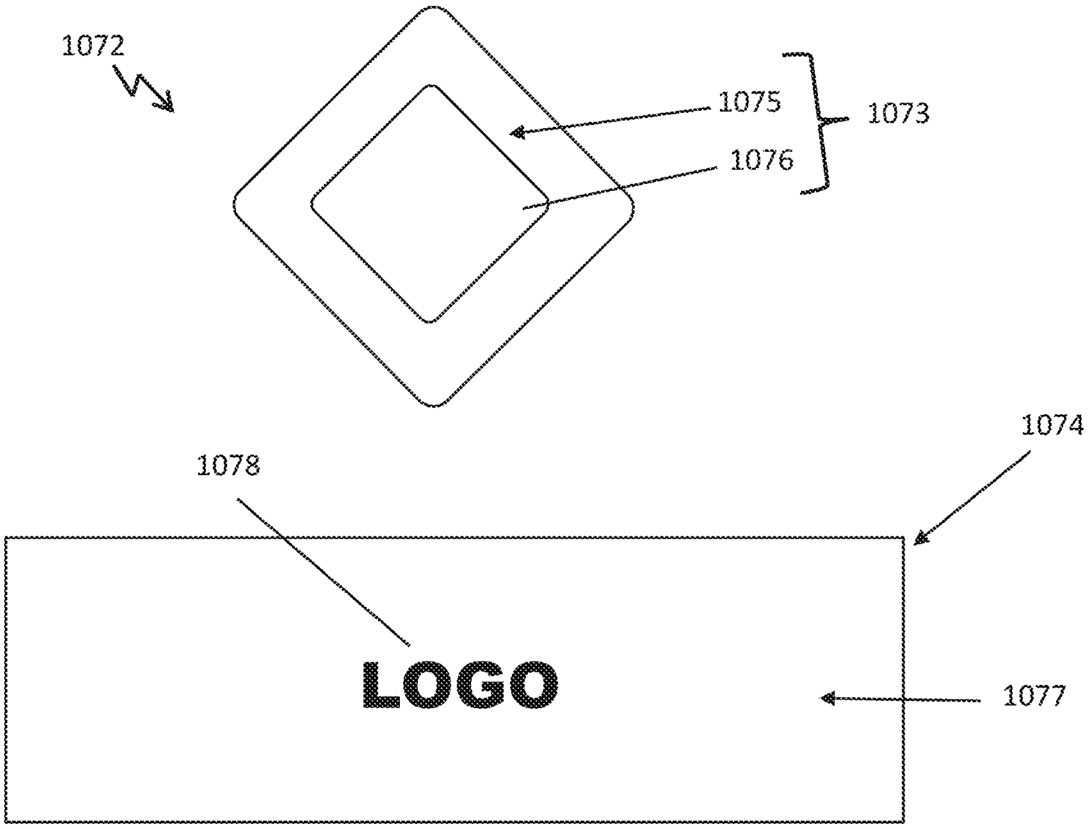
FIG. 18 illustrates a net signage system in accordance with another embodiment.
Figure 19:
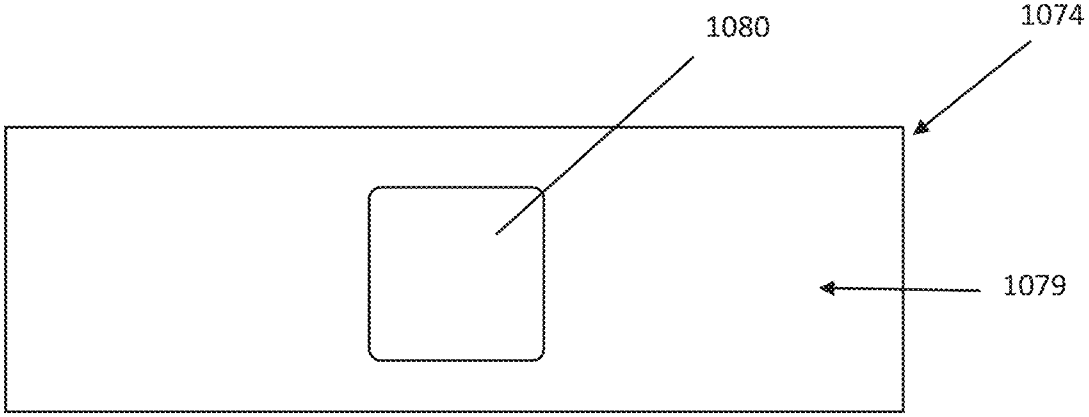
FIG. 19 illustrates a rear view of a display piece included in the net signage system of FIG. 18.
Figure 20:
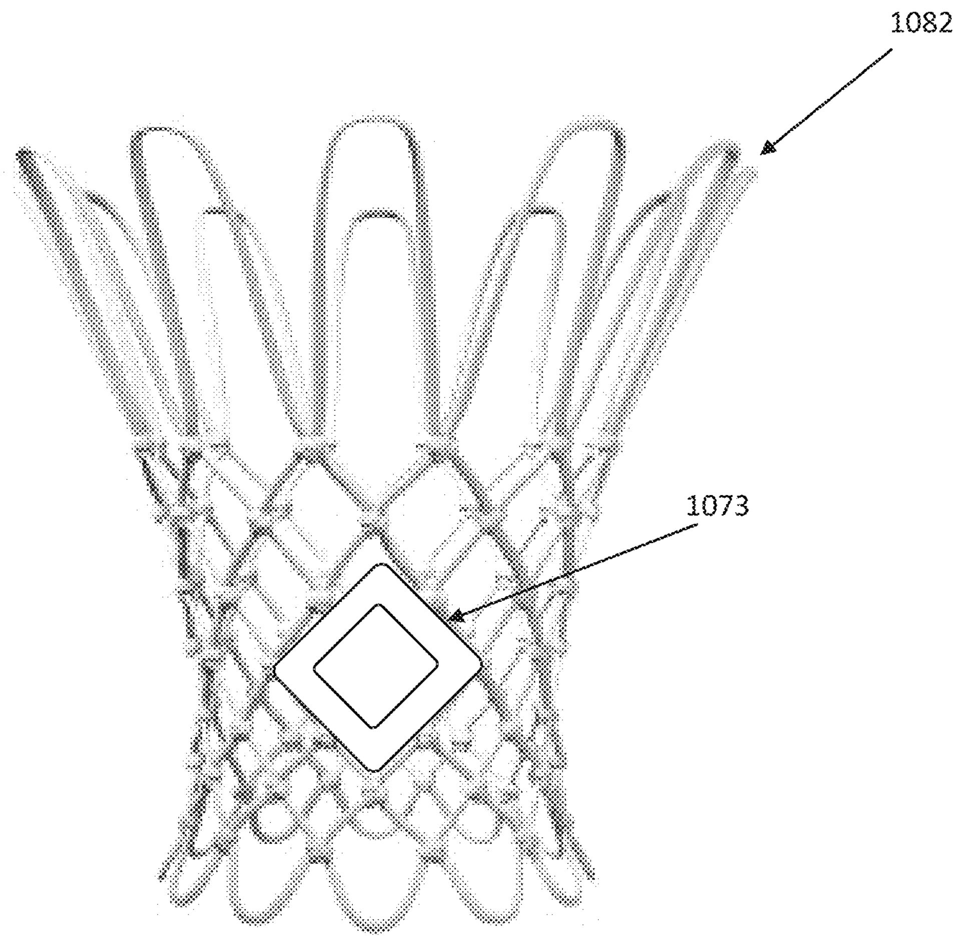
FIG. 20 illustrates a front view of a backing piece included in the net signage system of FIG. 18 in accordance with one embodiment when secured to a sports net.

Referring now to FIGS. 18-20, a net signage system 1072 is illustrated in accordance with another embodiment. As illustrated in FIG. 18, the net signage system 1072 includes two pieces: a backing piece 1073 and a display piece 1074. The backing piece 1073 includes a front surface 1075 all or a portion of which can include an adhesive region 1076. The rear surface (not illustrated) of the backing piece 1073 includes fasteners employed to temporarily secure the backing piece 1073 to a sports net. For example, in some embodiments, the rear surface of the backing piece 1073 is as illustrated and described with reference to FIG. 16B. That is, the backing piece 1072 can include a rear surface with a plurality of fasteners where each of the plurality of fasteners includes a channel configured to receive a cord included in a sports net.

The display piece 1074 includes a front surface 1077. Indicia 1078 such as text, graphics and or a combination of text and graphics is displayed on the front surface 1077. Referring to FIG. 19, the display piece 1074 includes a rear surface 1079. All or a portion of the rear surface can include an adhesive region 1080.

Figure 21:
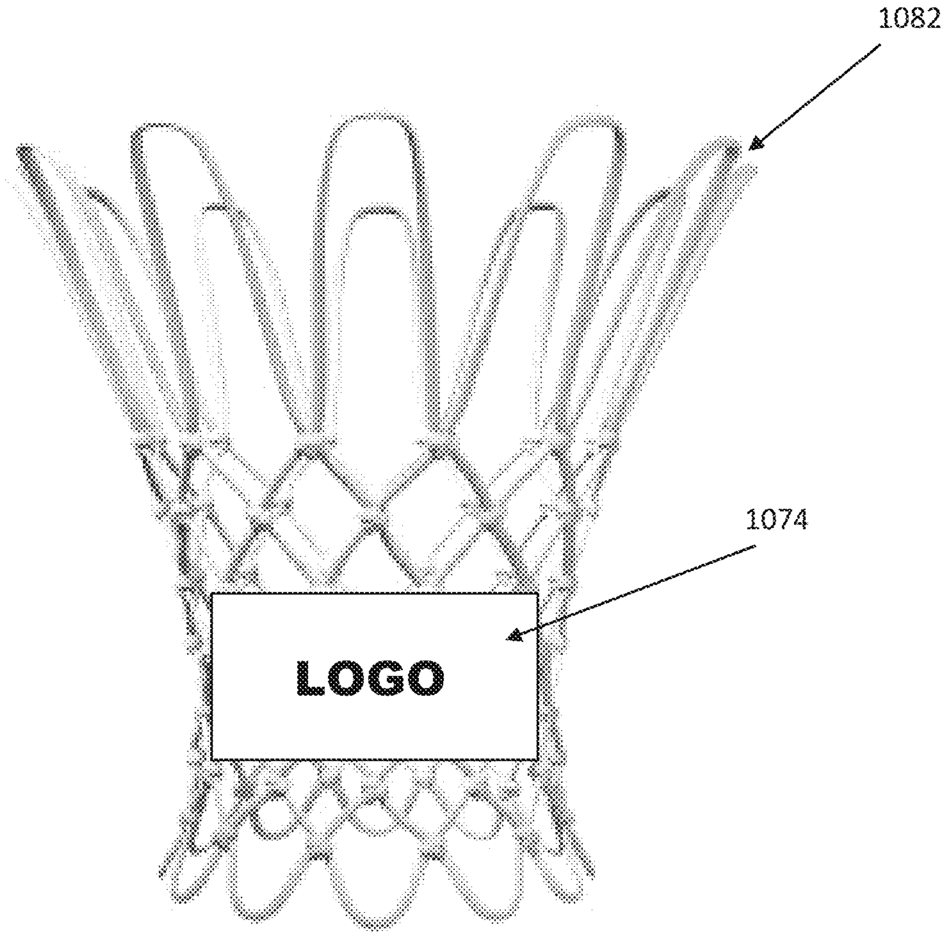
FIG. 21 illustrates a front view of the net signage system of FIG. 18 in accordance with one embodiment when secured to a sports net.

In operation, the backing piece 1073 included in the signage system 1072 is first secured to a sports net. For example, by securing a different net cord (or a different portion of the same net cord) within each of a plurality fasteners as described above with reference to the plurality of fasteners 1056A-1056D. Referring to FIG. 20, the backing piece 1074 is shown secured to a basketball net 1082. With the backing piece 1073 secured to the net 1082, the display piece 1074 is secured to the backing piece 1073 by pressing the adhesive region 1080 on the back of the display piece 1074 into contact with the adhesive region 1076 located on the front surface 1075 of the backing piece 1073. FIG. 21 illustrates the signage system 1072 with the display piece 1074 secured to the backing piece 1073. With the fully assembled signage system 1072 secured to the net 1082, the indicia 1078 is clearly displayed on the net 1082. Embodiments of the net signage system 1072 provide a dynamic and adaptable signage system to provide messaging including indicia such as logos or other graphics and/or text to that can promote an event, a venue, a team, an organization, an activity or an athlete as some examples.

The signage system 1072 permits displays that can include a variety of shapes and sizes, even as used with the same backing piece 1073. For example, while the display piece 1074 illustrated in FIGS. 18 and 19 has a rectangular shape, the display piece 1074 can include any of a variety of geometric shapes provided that the display includes an adhesive region (such as the adhesive region 1080) suitable to secure to the adhesive region 1076 on the backing piece 1073. In some embodiments, a kit is provided including at least one backing piece and a plurality of display pieces. In one embodiment, the plurality of display pieces included in a kit includes display pieces in a variety of different geographic shapes. Further, the display piece 1074 can be provided without any indicia. According to these embodiments, the blank display piece 1074 can have indicia added by an end user (for example, by hand drawing) before being fastened to a net. This approach can provide a customized and particularly unique piece of memorabilia (one-of-a-kind).

According to further embodiments, a larger display piece can be employed in combination with a set of backing pieces. For example, four backing pieces 1073 can be secured at four locations on a net where each location corresponds to a respective corner of the display piece 1074. In this embodiment, the rear surface 1079 of the display piece 1074 can include adhesive regions located adjacent each corner of the display piece 1074. This approach is particularly effective for nets with larger surface areas suitable for larger net signage such as soccer nets, tennis nets and volleyball nets as some examples. For larger display pieces 1074 additional backing pieces can be added. For example, six or eight backing pieces 1074 can be secured to the net for use with a square or rectangular display piece 1074 to secure each of four corners and multiple midpoints along the edges of the display piece. This approach can improve the appearance of large net signage displays by allowing the display piece to hang on the net without wrinkles, sagging, waves or other deformation of the surface of the display. In a further embodiment, a kit is provided including a plurality of backing pieces and at least one display piece.

Additionally, the signage system 1072 permits the same backing pieces to be employed with displays of different sizes and shapes. These embodiments can be employed to scale as the size of the display increases or decreases by changing the quantity of backing pieces 1073 that are employed along with the spacing and location of the backing pieces 1073 when secured to the net. In some embodiments, a small display can be secured with a single backing piece 1073. A first set of multiple backing pieces 1073 can be employed to attach a somewhat larger display piece 1074 to a net. A second set including a larger quantity of backing pieces 1073 can be employed to suspend an even larger display piece 1074 on a net. These embodiments are adaptable and permit an attachment of display pieces 1074 in a variety of shapes and sizes, where only a single size backing piece 1073 is used. A single size backing piece can also be employed in combination with display pieces 1074 having different shapes. In a further embodiment, a kit is provided including at least one backing piece 1073 and a plurality of display pieces 1074. In one embodiment, display pieces 1074 are provided in a variety of different shapes in the kit.

The ease of attachment and removal provided by both the one piece signage system 1050 and the multi-piece signage system 1072, respectively, allow for a series of unique items of sports memorabilia to be created during a single athletic event. For example, the net signage can easily be swapped out during a time out or other temporary break in athletic competition.

Embodiments of both the one piece signage system 1050 and the multi-piece signage system 1072 provide a universal signage attachment system for use across nets employed in a variety of sports. That is, a signage attachment system for sports netting allows for standardization across different categories of sports netting (for example, basketball nets, tennis nets, lacrosse nets, etc.) to provide added versatility. In some embodiments, the signage system is employed with different categories of sports netting having similar sized openings in the netting. In these embodiments, the same size backing piece, or alternatively, single-piece signage attachment system can be secured to nets across the different categories. According to these embodiments, a universally sized and spaced channel-based fastening system can be employed with nets used in different sports without modification.

Embodiments also provide a signage attachment system that can be safely employed in dynamic athletic activities in which athletes routinely contact the sports netting. Basketball is one such athletic activity but there are many others including volleyball for example. In some embodiments, the material(s) of construction of the signage systems 1050, 1072 are carefully selected to provide for athlete safety. While the materials of construction must be durable and stiff, they also require a degree of flexibility to allow them to deform and release from the net under a limited amount of force. The net signage systems 1050, 1072 must also be devoid of sharp edges. Referring again to basketball as one example, the net signage systems 1050, 1072 must include fasteners that secure the signage system 1050, 1072 during the repeated passage of the basketball through the net. However, the signage systems 1050, 1072 are manufactured from materials and with dimensions that, for example, allow the signage system 1050 or backing piece 1073 to pull free from the net cord if a players finger(s) get caught in the signage system 1050, 1072. Here, reference to flexibility can include flexibility of a body of the signage system 1050 or backing piece 1073 (that is, the planar regions illustrated in FIGS. 16-20). Reference to flexibility provided by materials of construction also refers to the structure of the arms 1058, 1060 included in the fasteners 1056A-1056D. That is, the arms 1058, 1060 must remain securely attached to the net with the cord secured in the channel 1070 during routine game play. But to avoid injury to the athlete, the arms 1058, 1060 must quickly deform and release the cord from the channel 1070 when force is applied by an athlete whose fingers or hand are caught in the signage system.

Applicant finds that the signage systems 1050, 1072 can be manufactured using 3-D printing or injection molding. According to some embodiments, the signage system 1050, 1072 is manufactured from a thermoplastic polyurethane (TPU). Applicant finds that this selection of material provides signage systems 1050, 1072 with impact strength, durability, tensile strength, abrasion resistance, and flexibility. In addition, signage systems 1050, 1072 manufactured from TPU can be 3D printed in multiple different colors. The use of a TPU filament is unique because it allows for multi-color indicia to be included in the signage systems 1050, 1072 during the 3D printing manufacturing process. These manufacturing techniques also permit the creation of 3D indicia with colored lettering and/or designs raised above the surfaces 1053, 1078. The application of multiple colors as well as 3D raised features provides greater flexibility and more options to deliver eye catching and aesthetically pleasing designs included in the indicia 1053, 1078. In summary and in some embodiments, signage systems 1050, 1072 manufactured with 3D printing of TPU material provide signage systems with a flexible logo piece that is securely attached to the netting in a manner that allows if pull off the net if needed to protect the athlete and eliminate a risk of injury. In these embodiments, applicant also finds that the TPU material can be easily written on or autographed with indelible marker making it ideal for memorabilia used in-game. In one embodiment, CHEETAH brand TPU 3D printing filament is employed. According to other embodiments, different materials can be used where for example color printing is not required as a part of the manufacturing process, for example, the signage systems 1050, 1073 can be manufactured using material such as TPE filament or processes such as SLS PA12, and SLS TPU.

While primarily described for use in applications where a sports net is employed, the net signage systems described herein can be employed with nets found in other applications. Further, while the embodiments illustrated and described with reference to FIGS. 16-20, show fasteners that have an overall square or rectangular shape, different shaped fasteners can be employed in other embodiments provided that they include a geometry that provides an enclosed channel accessed by a passageway that is sealed using resilient members to accommodate an insertion of a net cord within the channel and a removal of the net cord from the channel. For example, each of the outer arm and the inner arm can include an overall arcuate shape when viewed in profile. For example, each arm providing a "C" shape with one end of the C attached to the rear surface, a channel located within the inner arm and a passageway located between the two generally C-shaped arms.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A signage system for a sports net, the sports net including a plurality of cords, the signage system comprising:

a front surface configured for a display including at least one of text or graphics;

a rear surface; and a plurality of fasteners coupled to the rear surface, each of the plurality of fasteners including a deformable element defining a channel configured to receive a length of flexible material, wherein:

the plurality of fasteners include a first pair of fasteners positioned at first locations of the rear surface and configured to secure the signage system to separate cords in a first set of cords of the plurality of cords and a second pair of fasteners positioned at second locations of the rear surface and configured to secure the signage system to separate cords in a second set of cords of the plurality of cords, wherein the first set of cords extends in a first direction and the second set of cords extends in a second direction, the second direction being different than the first direction, the deformable element is u-shaped and includes a first portion connected to and extending away from the rear surface, an extension connected to the first portion and extending along the rear surface, and a second portion connected to the extension and extending towards the rear surface, a gap separates a distal end of the second portion from the rear surface; and a width of the gap is configured to increase when the deformable element is temporarily deformed to permit passage of the length of flexible material into the channel to secure the fastener to the plurality of cords.

2. The signage system of claim 1, wherein the deformable element is configured to temporarily deform to permit a removal of the length of flexible material from the channel.

3. The signage system of claim 2, wherein each of the plurality of fasteners includes a passageway within the deformable element to permit the passage of the length of flexible material between a first position adjacent the rear surface to a second position located within the channel.

4. The signage system of claim 3, wherein the deformable element is an outer deformable element, wherein each of the plurality of fasteners includes an inner deformable element, and wherein the passageway is located in a region separating the outer deformable element and the inner deformable element.

5. The signage system of claim 4, wherein the inner deformable element includes a first post and a first extension.

6. The signage system of claim 1, wherein each of the plurality of fasteners further includes an inner arm having a proximate end attached to the rear surface and a distal end, the inner arm located at least partially in a region between an interior surface of the deformable element and the rear surface, wherein the inner arm includes an extension positioned parallel to the rear surface, the extension including a post interior facing surface and a post exterior facing surface, wherein a passageway is located between the deformable element and the inner arm, and wherein the inner arm is configured to deflect to permit passage of the length of flexible material between the passageway and the channel when force is applied perpendicular to and in a direction of either one of the post interior facing surface and the post exterior facing surface.

7. The signage system of claim 1, further comprising a body including the front surface and the rear surface, wherein the body and the plurality of fasteners are manufactured using a thermoplastic polyurethane material.

8. The signage system of claim 7, wherein the body and the plurality of fasteners are manufactured using 3D printing.

9. The signage system of claim 1, wherein the deformable element is disposed such that the gap is oriented towards a perimeter of the rear surface.

10. A signage system for a sports net, the sports net including a plurality of cords, the signage system comprising:

a backing piece including a front surface including a first adhesive region, a rear surface and a plurality of fasteners coupled to the rear surface, each of the plurality of fasteners including a channel configured to receive a length of flexible material; and a display piece including a front surface configured for a display including at least one of text or graphics, and a rear surface including a second adhesive region, the second adhesive region configured to be temporarily secured to the first adhesive region wherein:

each of the plurality of fasteners includes a deformable element configured to temporarily deform to permit passage of the length of flexible material into the channel to secure the fastener to the plurality of cords, the deformable element includes a first post connected to and extending away from the rear surface, an extension extending along the rear surface, and a second post extending towards the rear surface, a gap separates a distal end of the second post from the rear surface; and a width of the gap is configured to increase when the deformable element is deformed to permit passage of the length of flexible material into the channel.

11. The signage system of claim 10, wherein each of the plurality of fasteners includes a plurality of flexible arms, each of the plurality of flexible arms attached to the rear surface of the backing piece, and wherein the plurality of flexible arms are arranged to define a passageway configured to receive the length of flexible material and permit travel of the length of flexible material from a location external to the plurality of flexible arms to the channel.

12. The signage system of claim 10, wherein the deformable element is an outer arm and each of the plurality of fasteners further includes an inner arm, the inner arm located at least partially in a region between an interior surface of the outer arm and the rear surface of the backing piece, wherein each of the plurality of fasteners includes a passageway located between the outer arm and the inner arm, the passageway permitting travel of the length of flexible material between the rear surface of the backing piece and the channel.

13. The signage system of claim 12, wherein the outer arm is configured to deflect to permit removal of the length of flexible material from the passageway.

14. The signage system of claim 10, wherein the first adhesive region includes a first hook and loop fastener, and wherein the second adhesive region includes a second hook and loop fastener configured to attach to the first hook and loop fastener.

* * * * *